(12) United States Patent
Nakao et al.

(10) Patent No.: US 10,455,516 B2
(45) Date of Patent: *Oct. 22, 2019

(54) TERMINAL APPARATUS AND RETRANSMISSION CONTROL METHOD

(71) Applicant: Optis Wireless Technology, LLC, Plano, TX (US)

(72) Inventors: Siego Nakao, Kanagawa (JP); Akihiko Nishio, Kanagawa (JP); Daichi Imamura, Kanagawa (JP)

(73) Assignee: Optis Wireless Technology, LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/814,169

(22) Filed: Nov. 15, 2017

(65) Prior Publication Data

US 2018/0084533 A1  Mar. 22, 2018

Related U.S. Application Data

(63) Continuation of application No. 15/157,065, filed on May 17, 2016, now Pat. No. 9,854,534, which is a
(Continued)

(30) Foreign Application Priority Data

Apr. 21, 2009 (JP) .................................. 2009-103261
Jun. 9, 2009 (JP) .................................. 2009-138611

(51) Int. Cl.
  *H04W 52/22* (2009.01)
  *H04W 24/04* (2009.01)
  (Continued)

(52) U.S. Cl.
  CPC ............ *H04W 52/22* (2013.01); *H04H 20/71* (2013.01); *H04L 1/08* (2013.01); *H04L 1/16* (2013.01);
  (Continued)

(58) Field of Classification Search
  CPC ... H04W 52/22; H04W 74/006; H04W 24/04; H04W 8/08; H04W 52/262
  See application file for complete search history.

(56) References Cited

U.S. PATENT DOCUMENTS 6,044,272 A  3/2000 Kobylinski et al.
6,285,874 B1  9/2001 Magnusson et al.
(Continued)

FOREIGN PATENT DOCUMENTS

CN  101133560 A  2/2008
CN  101356838 A  1/2009
(Continued)

OTHER PUBLICATIONS

Chinese Search Report for CN Application No. 201080017652.6 dated Sep. 26, 2013.
(Continued)

*Primary Examiner* — Joseph D Torres
(74) *Attorney, Agent, or Firm* — Nixon & Vanderhye P.C.

(57) ABSTRACT

A terminal apparatus and retransmission control method reduces overhead of the uplink control channel in cases when ARQ is applied in communication that uses an uplink unit band and a plurality of downlink unit bands associated with the uplink unit band. A first condition is set in which downlink assignment control information is transmitted from a base station by a unit band group which comprises a basic unit band, which is the downlink unit band on which a broadcast channel signal including information relating to the uplink unit band is transmitted, and a second downlink unit band other than the basic unit band. A bundling unit will not transmit a response signal to the base station in certain cases.

6 Claims, 11 Drawing Sheets

Related U.S. Application Data continuation of application No. 14/824,808, filed on Aug. 12, 2015, now Pat. No. 9,369,967, which is a continuation of application No. 13/258,095, filed as application No. PCT/JP2010/002852 on Apr. 20, 2010, now Pat. No. 9,143,280.

(51) Int. Cl.

| | | |
|---|---|---|
| *H04W 74/00* | (2009.01) | |
| *H04W 8/08* | (2009.01) | |
| *H04W 52/26* | (2009.01) | |
| *H04L 1/16* | (2006.01) | |
| *H04L 1/18* | (2006.01) | |
| *H04L 5/00* | (2006.01) | |
| *H04W 28/04* | (2009.01) | |
| *H04H 20/71* | (2008.01) | |
| *H04L 1/08* | (2006.01) | |
| *H04W 72/04* | (2009.01) | |
| *H04W 84/04* | (2009.01) | |

(52) U.S. Cl.
CPC .......... *H04L 1/1607* (2013.01); *H04L 1/1621* (2013.01); *H04L 1/1657* (2013.01); *H04L 1/1861* (2013.01); *H04L 5/001* (2013.01); *H04L 5/0007* (2013.01); *H04L 5/0053* (2013.01); *H04L 5/0055* (2013.01); *H04L 5/0094* (2013.01); *H04W 8/08* (2013.01); *H04W 24/04* (2013.01); *H04W 28/04* (2013.01); *H04W 52/262* (2013.01); *H04W 72/042* (2013.01); *H04W 72/0413* (2013.01); *H04W 74/006* (2013.01); *H04L 5/0016* (2013.01); *H04W 84/042* (2013.01)

(56) References Cited

U.S. PATENT DOCUMENTS

| | | | |
|---|---|---|---|
| 6,507,628 B1 | 1/2003 | McCallister et al. | |
| 6,556,829 B1 | 4/2003 | Persson | |
| 6,917,602 B2* | 7/2005 | Toskala | H04W 52/50 370/335 |
| 7,277,492 B2* | 10/2007 | Itoh | H04L 1/0001 375/219 |
| 8,014,803 B2 | 9/2011 | Harada et al. | |
| 8,031,656 B2* | 10/2011 | Balachandran | H04L 1/1812 370/328 |
| 8,160,033 B2* | 4/2012 | Kim | H04L 1/1822 370/336 |
| 8,289,866 B2 | 10/2012 | Sambhwani et al. | |
| 8,307,254 B2* | 11/2012 | Shiokawa | H04L 1/0042 714/758 |
| 8,681,602 B2 | 3/2014 | Nakao et al. | |
| 8,817,738 B2 | 8/2014 | Seo | |
| 8,923,221 B2* | 12/2014 | Nakao | H04L 5/0053 370/252 |
| 9,143,280 B2* | 9/2015 | Nakao | H04L 1/1607 |
| 9,854,534 B2* | 12/2017 | Nakao | H04L 1/1607 |
| 2004/0047425 A1* | 3/2004 | Itoh | H04L 1/0001 375/259 |
| 2005/0009528 A1 | 1/2005 | Iwamura et al. | |
| 2005/0265301 A1* | 12/2005 | Heo | H04L 1/0025 370/349 |
| 2006/0040700 A1 | 2/2006 | Roberts et al. | |
| 2006/0146764 A1* | 7/2006 | Takemoto | H04L 12/40065 370/338 |
| 2006/0183431 A1 | 8/2006 | Chang et al. | |
| 2006/0234713 A1 | 10/2006 | Oswal et al. | |
| 2007/0097938 A1 | 5/2007 | Nylander et al. | |
| 2007/0213086 A1 | 9/2007 | Claussen et al. | |
| 2007/0274343 A1 | 11/2007 | Nishio | |
| 2008/0068979 A1* | 3/2008 | Visotsky | H04L 1/1825 370/208 |
| 2008/0232307 A1 | 9/2008 | Pi et al. | |
| 2009/0016225 A1 | 1/2009 | Laroia | |
| 2009/0016261 A1 | 1/2009 | Laroia | |
| 2009/0016363 A1 | 1/2009 | Laroia | |
| 2009/0017838 A1 | 1/2009 | Laroia | |
| 2009/0042558 A1 | 2/2009 | Shen et al. | |
| 2009/0209261 A1 | 8/2009 | Kuri et al. | |
| 2009/0232236 A1 | 9/2009 | Yamamoto | |
| 2009/0275319 A1 | 11/2009 | Aoyama et al. | |
| 2009/0300456 A1 | 12/2009 | Pelletier et al. | |
| 2009/0316811 A1 | 12/2009 | Maeda et al. | |
| 2010/0031110 A1 | 2/2010 | Seok et al. | |
| 2010/0034077 A1* | 2/2010 | Ishii | H04J 11/00 370/210 |
| 2010/0074120 A1 | 3/2010 | Bergman et al. | |
| 2010/0103891 A1* | 4/2010 | Okubo | H04L 1/0013 370/329 |
| 2010/0118773 A1 | 5/2010 | Kawamura | |
| 2010/0142461 A1 | 6/2010 | Miki et al. | |
| 2010/0172290 A1 | 7/2010 | Nam et al. | |
| 2010/0188982 A1 | 7/2010 | Kato | |
| 2010/0189191 A1* | 7/2010 | Taoka | H04B 7/0617 375/295 |
| 2010/0232378 A1 | 9/2010 | Imamura et al. | |
| 2010/0309870 A1 | 12/2010 | Wengerter et al. | |
| 2010/0318659 A1 | 12/2010 | Chang et al. | |
| 2011/0021203 A1 | 1/2011 | Yamada | |
| 2011/0107169 A1 | 5/2011 | Lohr et al. | |
| 2011/0134872 A1* | 6/2011 | Nakao | H04L 5/0007 370/329 |
| 2011/0134874 A1 | 6/2011 | Nakao et al. | |
| 2011/0141941 A1 | 6/2011 | Lee | |
| 2011/0211510 A1 | 9/2011 | Kim et al. | |
| 2011/0211538 A1 | 9/2011 | Kakura | |
| 2012/0014309 A1 | 1/2012 | Iizuka et al. | |
| 2012/0026892 A1* | 2/2012 | Nakao | H04L 1/1854 370/242 |
| 2012/0069826 A1 | 3/2012 | Nakao et al. | |
| 2012/0087238 A1* | 4/2012 | Nakao | H04L 1/1861 370/225 |
| 2012/0089880 A1 | 4/2012 | Nakao et al. | |
| 2012/0092982 A1 | 4/2012 | Nakao et al. | |
| 2012/0106490 A1 | 5/2012 | Nakashima | |
| 2012/0134333 A1* | 5/2012 | Nakao | H04L 1/0029 370/329 |
| 2012/0140728 A1 | 6/2012 | Nakao et al. | |
| 2012/0182858 A1* | 7/2012 | Nakao | H04L 1/1854 370/216 |
| 2012/0329514 A1 | 12/2012 | Noh | |
| 2013/0021920 A1 | 1/2013 | Nakao et al. | |
| 2013/0034089 A1 | 2/2013 | Nakashima | |
| 2013/0044720 A1 | 2/2013 | Nakao et al. | |
| 2013/0064210 A1 | 3/2013 | Nakao | |
| 2013/0235826 A1 | 9/2013 | Nakao et al. | |

FOREIGN PATENT DOCUMENTS

| | | |
|---|---|---|
| CN | 101478379 A | 7/2009 |
| CN | 101502158 A | 8/2009 |
| CN | 102461245 A | 5/2012 |
| EP | 1 524 791 A2 | 4/2005 |
| EP | 2 007 021 A1 | 12/2008 |
| EP | 2 015 496 A1 | 1/2009 |
| JP | 2009-273171 A | 11/2009 |
| JP | 5448211 B2 | 3/2014 |
| WO | 99/27736 A1 | 6/1999 |
| WO | 02/43430 A1 | 5/2002 |
| WO | 2007/015529 A1 | 2/2007 |
| WO | 2007/020997 A1 | 2/2007 |
| WO | 2008/123024 A1 | 10/2008 |
| WO | 2009/037853 A1 | 3/2009 |
| WO | 2009/044367 A2 | 4/2009 |
| WO | 2009/076297 A2 | 6/2009 |

(56) References Cited

FOREIGN PATENT DOCUMENTS

| WO | 2009/098219 A2 | 8/2009 |
|---|---|---|
| WO | 2010/122783 A1 | 10/2010 |

OTHER PUBLICATIONS

Office Action dated Jul. 15, 2013 in U.S. Appl. 13/263,171.
International Search Report dated Jun. 15, 2010 in PCT application PCT/JP2010/002956.
Notice of Allowance dated Jul. 18, 2014 in U.S. Appl. No. 13/389,255.
Frenger et al, "Performance Comparison of HARQ with Chase Combining and Incremental Redundancy for HSDPA", Proc. IEEE VTC, '01-Fall, Oct. 2011.
3GPP TSG RAN WG1 Meeting #56bis, R1-091275, "PUCCH Design for Carrier Aggregation", Seoul, Republic of Korea, Mar. 23-27, 2009.
3GPP TSG RAN WG1 Meeting #57, "Uplink Control Channel Design for LTE-Advanced", ZTE, R1-091702, San Francisco, USA, May 4-8, 2009.
Notice of Allowance dated Nov. 13, 2013 in U.S. Appl. No. 13/498,287.
Huawei, "Draft CR on Corrections for TDD ACK/NACK Bundling and Multiplexing", Texas Instruments, ZTE, Ericsson, Nokia, Nokia Siemens Networks, CMCC, CATT, R1-084345, 3GPP TSG RAN Meeting #55, Prague, Czech Republic, Nov. 10-14, 2008.
Texas Instruments, "Multiple ACK/NAK Transmission in TDD", R1-083124, Agenda item; 6.3, 3GPP RAN WG1 #54, Jeju, South Korea, Aug. 18-22, 2008.
3GPP TSG RAN WG1 Meeting #56ibs, "PHICH Linkage for Asymmetric Carrier Aggregation", Panasonic, R1-091169, Seoul, Korea, Mar. 23-27, 2009.
3GPP TSG RAN WG1 #54, "Way Forward on Support of ACK/NAK Repetition", Texas Instruments, LGE, Samsung, Z1E, R1-083123, Jeju, South Korea, Aug. 18-22, 2008.
Nakao et al, "Performance Enhancement of E-UTRA Uplink Control Channel in Fast Fading Environments", IEEE 69$^{th}$ Vehicular Technology Conference, 2009, VTC Spring 2009.
3GPP TSG RAN WG1 Meeting #60, "Support of UL ACK/NACK Channel Selection for Carrier Aggregation", Panasonic, R1-101253, San Francisco, USA, Feb. 22-26, 2010.
International Search Report dated Sep. 21, 2010 in PCT application PCT/JP2010/004100.
Office Action dated Feb. 27, 2014 in U.S. Appl. No. 13/389,255.
3GPP TSG RAN WG1 Meeting #57, "UL ACK/NACK Transmission on PUCCH for Carrier Aggregation", Panasonic, R1-091744, San Francisco, USA, May 4-8, 2009.
TSG-RAN WG1 #56bis, R1-091427, "Uplink Control Channel Design for LTE-Advanced", Seoul, Republic of Korea, Mar. 23-27, 2009.
3GPP TSG RAN 1#56bis, R1-091329, "Uplink Control Signalling Design for Carrier Aggregation", Seoul, Republic of Korea, Mar. 23-27, 2009.
Office Action dated Sep. 30, 2013 in U.S. Appl. No. 13/376,987.
3GPP TSG RAN WG1 Meeting #54, "Necessity of the Scrambling for ACK/NACK on PUCCH", Panasonic, NTT DoCoMo, R1-082403, Warsaw, Poland, Jun. 30-Jul. 4, 2008.
CATT, "Dynamic ACK/NACK Resource Reservation of PUCCH in LTE-A", R1-094545, 3GPP TSG RAN WG1 Meeting #59, Jeju, Korea, Nov. 9-13, 2009.
Huawei, "PUCCH Design for Carrier Aggregation", R1-093046, 3GPP TSG RAN Aug. 24-28, 2009 WG1 Meeting #58, Shenzhen, China, Aug. 24-28, 2009.
3GPP TSG RAN WG1 #53b, "ACK/NAK DTX Detection for Concurrent Transmission of ACK/NAK and SRI", Texas Instruments, R1-082487, Warsaw, Poland, Jun. 30-Jul. 4, 2008.
3GPP TSG RAN WG1 Meeting #54bis, "Further Consideration on ACK/NACK Multiplexing in TDD", Samsung, R1-083560, Prague, Czech Republic, Sep. 29-Oct. 3, 2008.
3GPP TSG RAN WG1 #55, "Correction on TDD ACK/NAK Multiplexing Mapping Scheme for M=4", Texas Instruments, R1-084509, Prague, Czech Republic, Nov. 10-14, 2008.
3GPP TSG RAN WG1 Meeting #56, "UL Control Signalling to Support Bandwidth Extension in LTE-Advanced", Nokia Siemens Networks, Nokia, R1-090724, Athens, Greece, Feb. 9-13, 2009.
3GPP TSG RAN WG1 Meeting #57bis, "Uplink Control Channel Design for LTE-Advanced", ZTE, R1-092464, San Francisco, USA, Jun. 29-Jul. 3, 2009.
3GPP TSG RAN WG1 Meeting #57bis, "UL Control Signalling for Carrier Aggregation", Nokia Siemens Networks, Nokia, R1-092572, Los Angeles, CA, USA, Jun. 29-Jul. 3, 2009.
3GPP TSG RAN WG1 Meeting #57bis, "Multi-Channel Transmission for UL ACK/NACK in LTE-A", CATT, R1092788, Los Angeles, CA, USA, Jun. 29-Jul. 3, 2009.
3GPP TSG RAN WG1 Meeting #57bis, "UL ACK/NACK Transmission Scheme for LTE-A", CATT, R1-092789, Los Angeles, CA, USA, Jun. 29-Jul. 3, 2009.
Nokia Siemens Networks, Nokia, "Simultaneous Transmission of ACK/NACK and SR", R1-080932, Agenda item 6.1.4, 3GPP TSG RAN WG1 Meeting #52, Sorrento, Italy, Feb. 11-15, 2008.
Nokia Siemens Networks, Nokia, "DTX Detection in Case of Simultaneous Transmission of SR and ACK/NACK", R1-080933, Agenda item 6.1.4, 3GPP TSG RAN WG1 Meeting #52, Sorrento, Italy, Feb. 11-15, 2008.
International Search Report dated Oct. 19, 2010 in PCT Application PCT/JP 2010/004970.
International Search Report dated Sep. 14, 2010 in PCT application PCT/JP2010/004881.
3GPPP TS 36.211 V8.6.0, "Physical Channels and Modulation" (Release 8), Mar. 2009.
3GPPP TS 36.212 V8.6.0, "Multiplexing and channel coding" (Release 8), Mar. 2009.
3GPPP TS 36.213 V8.6.0, "Physical layer procedures" (Release 8), Mar. 2009.
Panasonic, "UL ACK/NACK transmission on PUCCH for carrier aggregation", 3GGP TSG-RAN WG1 Meeting #56bis, R1-091170, Mar. 27, 2009, Passage 2.1.
Panasonic, "UL ACK/NACK transmission on PUCCH for carrier aggregation", 3GGP TSG-RAN WG1 Meeting #57bis, R1-092535, Jul. 3, 2009, Passage 2.1.
3GPP TSG-RAN WG1 Meeting #55ibs, Ljubljana, Slovenia, Jan. 12-16, 2009, R1-090234, Nokia, Nokia Siemens Networks, "L 1 control signalling to support bandwith extension in LT E-Advanced".
3GPP TSG-RAN WG1 Meeting #54ibs, Prague, Czech Republic, Sep. 29-Oct. 3, 2008, R1-083730, Nokia, Nokia Siemens Networks, "UL control signaling with carrier aggregation in LT E-Advanced".
3GPP TSG WG1 #56, R1-090860, Qualcomm Europe, "Notion of Carrier in LTE-A", Athens, Greece, Feb. 9-13, 2009.
International Search Report for JP/PCT2010/002852 dated May 25, 2010.
Supplementary European Search Report dated Feb. 9, 2017 in EP application 10766844.4.
TSG-RAN1 #56bis, R1-091568, CMCC, "Consideration on reducing blind decoding attempts for separate PDCCH design", Seoul, Korea, Mar. 23-27, 2009.
3GPP TSG RAN WG1 #55 Meeting, R1-084321, Nokia Siemens Networks, Nokia, "Algorithms and results for autonomous component carrier selection for LTE-Advanced", Prague, Czech Republic, Nov. 10-14, 2008.
3GPP TSG RAN WG1 #55bis, R1-080356, Qualcomm Europe, "Notification of Anchor Carrier in LTE-A", Ljubljana, Slovenia, Jan. 12-16, 2009.
Chinese First Office Action and English translation thereof dated Nov. 28, 2016 in CN Patent Application 201410311928.1.
Office Action dated Apr. 27, 2017 in U.S. Appl. No. 15/157,065.
Notice of Allowance dated Aug. 16, 2017 in U.S. Appl. No. 15/157,065.
EP Communication pursuant to Article 94(3) (EPC) dated Sep. 5, 2018 in EP application 10766844.4.
TSG RAN WG1 #55bis, R1-090356, Qualcomm Europe, "Notion of Anchor Carrier in LTE-A", Ljubljana, Slovenia, Jan. 12-16, 2009.

(56) References Cited

OTHER PUBLICATIONS

TSG-RAN WG1 #54, R1-083065, Ericsson, "On multiple ACK/NAK multiplexing on PUCCH for TDD", Jeju, South Korea, Aug. 18-22, 2008.

* cited by examiner

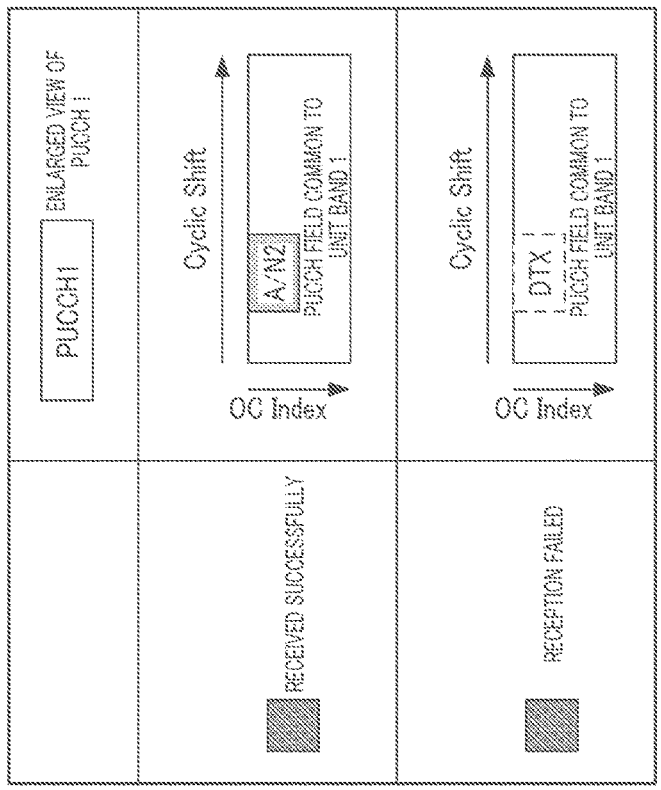
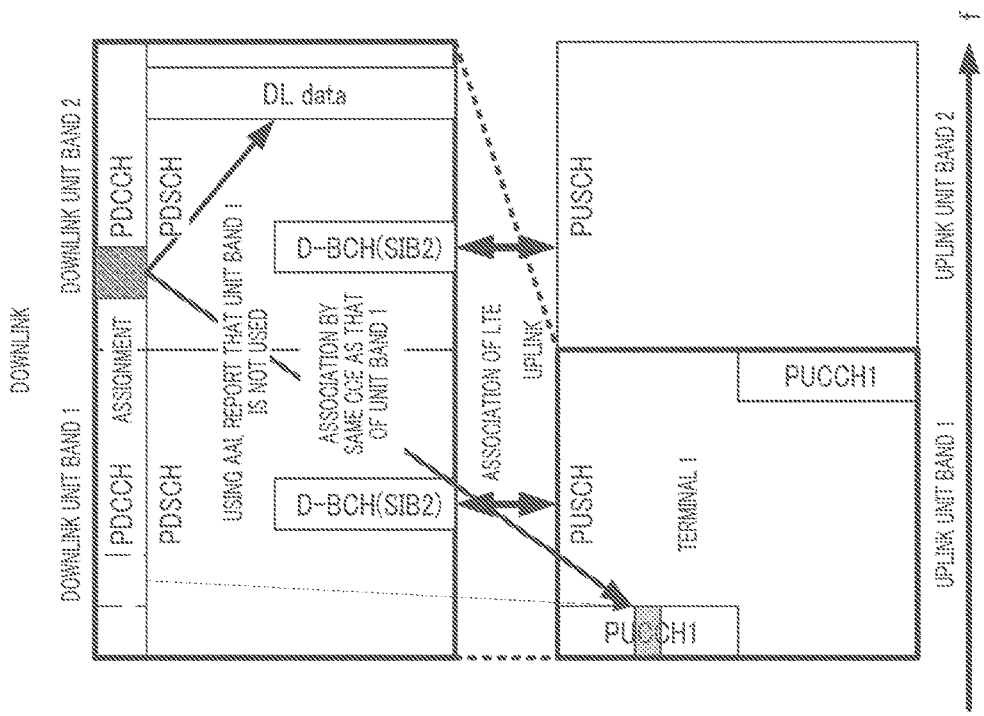
FIG. 8B
FIG. 8A

TERMINAL APPARATUS AND RETRANSMISSION CONTROL METHOD

This application is a continuation of U.S. patent application Ser. No. 15/157,065 filed May 17, 2016 (pending), which is a continuation of U.S. patent application Ser. No. 14/824,808 filed Aug. 12, 2015 (U.S. Pat. No. 9,369,967), which is a continuation of U.S. patent application Ser. No. 13/258,095 filed Sep. 21, 2011 (U.S. Pat. No. 9,143,280), which is a National Phase of PCT Application PCT/JP2010/002852 filed Apr. 20, 2010, which claims priority of Japanese Application 2009-138611 filed Jun. 9, 2009 and Japanese Application 2009-103261 filed Apr. 21, 2009, all of which are hereby incorporated by reference herein.

TECHNICAL FIELD

The present invention relates to a terminal apparatus and a retransmission control method.

BACKGROUND ART

3GPP LTE adopts OFDMA (Orthogonal Frequency Division Multiple Access) as a downlink communication scheme. In a radio communication system to which 3GPP LTE is applied, a base station transmits a synchronization signal (Synchronization Channel: SCH) and a broadcast signal (Broadcast Channel: BCH) using predetermined communication resources. A terminal secures synchronization with the base station by catching the SCH first. The terminal then reads BCH information and thereby acquires parameters (e.g. frequency bandwidth) peculiar to the base station (see Non-Patent Literatures 1, 2, 3).

Furthermore, after completing the acquisition of the parameters peculiar to the base station, the terminal requests the base station for a connection and thereby establishes communication with the base station. The base station transmits control information to the terminal with which communication is established via a PDCCH (Physical Downlink Control CHannel) as required.

The terminal then makes a "blind detection" on a plurality of pieces of control information included in the received PDCCH signal. That is, the control information includes a CRC (Cyclic Redundancy Check) portion and this CRC part is masked with a terminal ID of the destination terminal in the base station. Therefore, the terminal cannot decide whether the control information is directed to the terminal or not until the terminal demasks the CRC part of the received control information using the terminal ID of the terminal. In this blind detection, when the demasking result shows that the CRC calculation results in OK, the control information is decided to be directed to the terminal.

Furthermore, 3GPP LTE applies ARQ (Automatic Repeat Request) to downlink data from the base station to the terminal. That is, the terminal feeds back a response signal indicating an error detection result of the downlink data to the base station. The terminal performs a CRC on the downlink data and feeds back ACK (Acknowledgment) when CRC=OK (no error) or NACK (Negative Acknowledgment) when CRC=NG (error present) to the base station as a response signal. An uplink control channel such as a PUCCH (Physical Uplink Control Channel) is used to feed back this response signal (that is, ACK/NACK signal).

Here, the above-described control information transmitted from the base station includes resource assignment information including resource information or the like assigned to the terminal by the base station. The above-described PDCCH is used to transmit the control information. The PDCCH is constructed of one or a plurality of L1/L2 CCHs (L1/L2 Control Channel). Each L1/L2 CCH is constructed of one or a plurality of CCEs (Control Channel Elements). That is, the CCE is a base unit when control information is mapped to the PDCCH. Furthermore, when one L1/L2 CCH is constructed of a plurality of CCEs, a plurality of continuous CCEs are assigned to the L1/L2 CCH. The base station assigns an L1/L2 CCH to a resource assignment target terminal according to the number of CCEs necessary to report control information to the resource assignment target terminal. The base station then transmits the control information mapped to physical resources corresponding to the CCEs of the L1/L2 CCH.

Furthermore, here, the CCEs are associated with component resources of a PUCCH in a one-to-one correspondence. Therefore, the terminal that receives the L1/L2 CCH identifies component resources of the PUCCH corresponding to CCEs making up the L1/L2 CCH and transmits a response signal to the base station using the resources. Downlink communication resources are thereby efficiently used.

A plurality of response signals transmitted from a plurality of terminals are spread on the time axis by a ZAC (Zero Auto-correlation) sequence having Zero Auto-correlation characteristics, Walsh sequence and DFT (Discrete Fourier Transform) sequence and code-multiplexed within a PUCCH as shown in FIG. 1. In FIG. 1, $(W_0, W_1, W_2, W_3)$ represents a Walsh sequence having a sequence length of 4 and $(F_0, F_1, F_2)$ represents a DFT sequence having a sequence length of 3. As shown in FIG. 1, in the terminal, a response signal of ACK or NACK is primary-spread within 1 SC-FDMA symbol by a ZAC sequence (sequence length 12) on the frequency axis first. Next, the primary-spread response signals are associated with $W_0$ to $W_3$, $F_0$ to $F_3$ respectively and subjected to IFFT (Inverse Fast Fourier Transform). The response signal spread by the ZAC sequence having a sequence length of 12 on the frequency axis is transformed into the ZAC sequence having a sequence length of 12 on the time axis through IFFT. The signal after the IFFT is further secondary-spread using a Walsh sequence (sequence length 4) and DFT sequence (sequence length 3).

Furthermore, standardization of 3GPP LTE-advanced has been started which realizes still faster communication than 3GPP LTE. A 3GPP LTE-advanced system (hereinafter also referred to as "LTE-A system") follows the 3GPP LTE system (hereinafter also referred to as "LTE system"). In order to realize a downlink transmission rate of maximum 1 Gbps or above, 3GPP LTE-advanced is expected to introduce base stations and terminals capable of communicating at a wideband frequency of 40 MHz or above.

In an LTE-A system, to realize communication at an ultra-high speed several times as fast as the transmission rate in an LTE system and backward compatibility with the LTE system simultaneously, a band assigned to the LTE-A system is divided into "unit bands" of 20 MHz or less which is a support bandwidth of the LTE system. That is, the "unit band" is a band having a width of maximum 20 MHz and defined as a base unit of a communication band. Furthermore, the "unit band" (hereinafter referred to as "downlink unit band") in a downlink may be defined as a band divided by downlink frequency band information in a BCH broadcast from the base station or by a spreading width when the downlink control channel (PDCCH) is arranged by being spread in the frequency domain. Furthermore, the "unit band" (hereinafter referred to as "uplink unit band") in an uplink may be defined as a band divided by uplink frequency band information in a BCH broadcast from the base station or as a base unit of a communication band of 20 MHz or less including a PUSCH (Physical Uplink Shared CHannel) field near the center and PUCCHs for LTE at both ends. Furthermore, in 3GPP LTE-Advanced, the "unit band" may also be expressed as "component carrier(s)" in English.

The LTE-A system supports communication using a band that bundles several unit bands, so-called "carrier aggregation." Since throughput requirements for uplinks and throughput requirements for downlinks are generally different, in the LTE-A system, studies are being carried out on carrier aggregation in which the number of unit bands set for an arbitrary LTE-A system compatible terminal (hereinafter referred to as "LTE-A terminal") differs between the uplink and downlink, so-called "asymmetric carrier aggregation." Furthermore, cases are also supported where the numbers of unit bands are asymmetric between the uplink and downlink, and the frequency bandwidth differs from one unit band to another.

FIG. 2B is a diagram illustrating asymmetric carrier aggregation; FIG. 2A illustrates a control sequence applicable to individual terminals. FIG. 2B shows an example where bandwidths and the number of unit bands are symmetric between the uplink and downlink of the base station.

In FIG. 2B, a setting (configuration) is made for terminal 1 so as to perform carrier aggregation using two downlink unit bands and one uplink unit band on the left side, whereas although a setting is made for terminal 2 so as to use two downlink unit bands identical to those of terminal 1, a setting is made in uplink communication so as to use the uplink unit band on the right side.

Focusing attention on terminal 1, signals are transmitted/received between an LTE-A base station and an LTE-A terminal making up an LTE-A system according to the sequence diagram shown in FIG. 2A. As shown in FIG. 2A, (1) terminal 1 establishes synchronization with the downlink unit band on the left side at a start of communication with the base station and reads information of the uplink unit band which forms a pair with the downlink unit band on the left side from a broadcast signal called "SIB 2 (System Information Block Type 2)." (2) Using this uplink unit band, terminal 1 starts communication with the base station by transmitting, for example, a connection request to the base station. (3) Upon deciding that a plurality of downlink unit bands need to be assigned to the terminal, the base station commands the terminal to add downlink unit bands. In this case, however, the number of uplink unit bands does not increase and terminal 1 which is an individual terminal starts asymmetric carrier aggregation.

CITATION LIST

Non-Patent Literature

NPL 1
3GPP TS 36.211 V8.6.0, "Physical Channels and Modulation (Release 8)," March, 2009
NPL 2
3GPP TS 36.212 V8.6.0, "Multiplexing and channel coding (Release 8)," March, 2009
NPL 3
3GPP TS 36.213 V8.6.0, "Physical layer procedures (Release 8)," March, 2009

SUMMARY OF INVENTION

Technical Problem

By the way, LTE-A is studying a transmission method for transmitting a response signal by bundling a plurality of response signals for a plurality of pieces of data transmitted in a plurality of downlink unit bands into one signal, so-called "ACK/NACK bundling" (hereinafter simply referred to as "bundling"). In bundling, the terminal calculates AND (that is, logical AND) between a plurality of ACK/NACK signals to be transmitted and feeds back the calculation result as a "bundled ACK/NACK signal" to the base station.

When the above-described asymmetric carrier aggregation is applied to the terminal, ARQ is controlled as follows. For example, as shown in FIG. 3, when a unit band group made up of downlink unit bands 1 and 2, and uplink unit band 1 is set for terminal 1, downlink resource assignment information is transmitted from the base station to terminal 1 via respective PDCCHs of downlink unit bands 1 and 2 and downlink data is then transmitted using resources corresponding to the downlink resource assignment information. An ACK/NACK signal for the downlink data transmitted in downlink unit band 1 may be transmitted via a PUCCH of uplink unit band 1 corresponding to downlink unit band 1 as in the case of the conventional (LTE) system. However, when a unit band group as shown in FIG. 3 is set in terminal 1, since the uplink unit band included in the unit band group is only uplink unit band 1, unlike the conventional system, an ACK/NACK signal for the downlink data transmitted in downlink unit band 2 also needs to be transmitted via a PUCCH of uplink unit band 1.

When terminal 1 succeeds in receiving both of the two pieces of downlink data (CRC=OK), terminal 1 calculates AND between ACK (=1) for downlink unit band 1 and ACK (=1) for downlink unit band 2, and, as a result, "1" (that is, ACK) is transmitted to the base station as a bundled ACK/NACK signal. Furthermore, when terminal 1 succeeds in receiving downlink data in downlink unit band 1 and fails to receive downlink data in downlink unit band 2, terminal 1 calculates AND between ACK (=1) for the downlink unit band and NACK (=0) for downlink unit band 2 and transmits "0" (that is, NACK) to the base station as a bundled ACK/NACK signal. Similarly, when terminal 1 fails to receive both of the two pieces of downlink data, terminal 1 calculates AND between NACK (=0) and NACK (=0) and feeds back "0" (that is, NACK) to the base station as a bundled ACK/NACK signal.

Thus, with bundling, the terminal transmits only one ACK to the base station as a bundled ACK/NACK signal only when succeeding in receiving a plurality of pieces of downlink data transmitted to the terminal and transmits only one NACK to the base station as a bundled ACK/NACK signal when failing to receive even one piece of downlink data, and can thereby reduce overhead in the uplink control channel. The terminal side transmits a bundled ACK/NACK signal using PUCCH resources having, for example, the smallest frequency or identification number (index) from among respective PUCCH resources corresponding to a plurality of CCEs occupied by a plurality of received downlink control signals.

However, since each terminal makes a blind detection on a downlink assignment control signal directed to the terminal in each subframe, the terminal side does not always succeed in receiving the downlink assignment control signal. When the terminal fails to receive a downlink assignment control signal in a certain downlink unit band, the terminal cannot even know whether downlink data exists in the downlink unit band or not. Therefore, when failing to receive a downlink assignment control signal in a certain downlink unit band, the terminal does not even generate any response signal for the downlink data in the downlink unit band. This error case is defined as DTX (DTX (discontinuous transmission) of ACK/NACK signals) of a response signal in the sense that the terminal side does not transmit any response signal.

DTX that occurs on the terminal side in this way needs to be taken into consideration on the base station side. That is, the base station cannot predict in which downlink unit band the terminal succeeds in receiving a downlink assignment control signal beforehand, and as a result, of CCEs to which the downlink assignment control signal is mapped, the base station does not know with which CCE, the PUCCH resource used to transmit the response signal is associated. Therefore, the base station side must secure all PUCCH resources corresponding to CCEs to which the plurality of downlink assignment control signals are mapped for response signals of terminals to be controlled.

Furthermore, in LTE, downlink unit band 1 is associated with uplink unit band 1 to form a band pair and downlink unit band 2 is associated with uplink unit band 2 to form a band pair, and therefore PUCCHs corresponding to downlink unit band 2 need to be provided only for uplink unit band 2. On the other hand, in LTE-A, when asymmetric carrier aggregation is individually set (configured) for each terminal, it is necessary to secure PUCCH resources for response signals corresponding to downlink unit band 2 also in uplink unit band 1 because of the unit band association peculiar to the LTE-A between downlink unit band 2 and uplink unit band 1 as shown in FIG. 4.

This indicates that the LTE-A system has greater PUCCH overhead than the LTE system and cannot reduce PUCCH overhead even in the case where bundling is applied.

It is therefore an object of the present invention to provide a terminal apparatus and a retransmission control method capable of reducing overhead of an uplink control channel when ARQ is applied in communication using an uplink unit band and a plurality of downlink unit bands associated with the uplink unit band.

Solution to Problem

A terminal apparatus according to the present invention is a terminal apparatus that communicates with a base station using a unit band group made up of a plurality of downlink unit bands and uplink unit bands and transmits a response signal based on an error detection result of downlink data arranged in a downlink unit band through an uplink control channel of an uplink unit band corresponding to the downlink unit band, and adopts a configuration including a control information receiving section that receives downlink assignment control information transmitted through downlink control channels of the plurality of downlink unit bands, a downlink data receiving section that receives the downlink data transmitted through a downlink data channel indicated by the downlink assignment control information, an error detection section that detects a reception error of the received downlink data and a response control section that controls transmission of a response signal used for retransmission control of the downlink data in the base station based on the error detection result obtained in the error detection section and success/failure in the reception of the downlink assignment control information, wherein the response control section transmits, when the control information receiving section succeeds in receiving downlink assignment control information transmitted in a base unit band which is a downlink unit band in which a broadcast channel signal containing information on the uplink unit band in the unit band group is transmitted and a second downlink unit band other than the base unit band, the response signal to the base station using resources of the uplink control channel associated with the downlink control channel in the base unit band and provided for the uplink unit band and does not transmit, when the control information receiving section succeeds in receiving only the downlink assignment control information transmitted in the second downlink unit band, the response signal to the base station.

A retransmission control method according to the present invention includes a control information receiving step of receiving downlink assignment control information transmitted through downlink control channels of a plurality of downlink unit bands included in a unit band group, a downlink data receiving step of receiving downlink data transmitted through a downlink data channel indicated by the downlink assignment control information, an error detection step of detecting a reception error of the received downlink data and a response control step of controlling transmission of a response signal used for retransmission control of the downlink data in a base station based on the error detection result obtained in the error detection section and success/failure in the reception of the downlink assignment control information, wherein in the response control step, when the reception of downlink assignment control information transmitted in a base unit band which is a downlink unit band in which a broadcast channel signal containing information on the uplink unit band in the unit band group is transmitted and a second downlink unit band other than the base unit band is successful in the control information receiving step, the response signal is transmitted to the base station using resources of the uplink control channel associated with the downlink control channel in the base unit band and provided for the uplink unit band, and, when the reception of only the downlink assignment control information transmitted in the second downlink unit band is successful in the control information receiving step, the response signal is not transmitted.

Advantageous Effects of Invention

According to the present invention, it is possible to provide a terminal apparatus and retransmission control method capable of reducing overhead of an uplink control channel when ARQ is applied in communication using an uplink unit band and a plurality of downlink unit bands associated with the uplink unit band.

BRIEF DESCRIPTION OF DRAWINGS

FIG. 8A and FIG. 8B are diagrams illustrating operations of a base station and terminal according to Embodiment 2;

DESCRIPTION OF EMBODIMENTS

Figure 1:
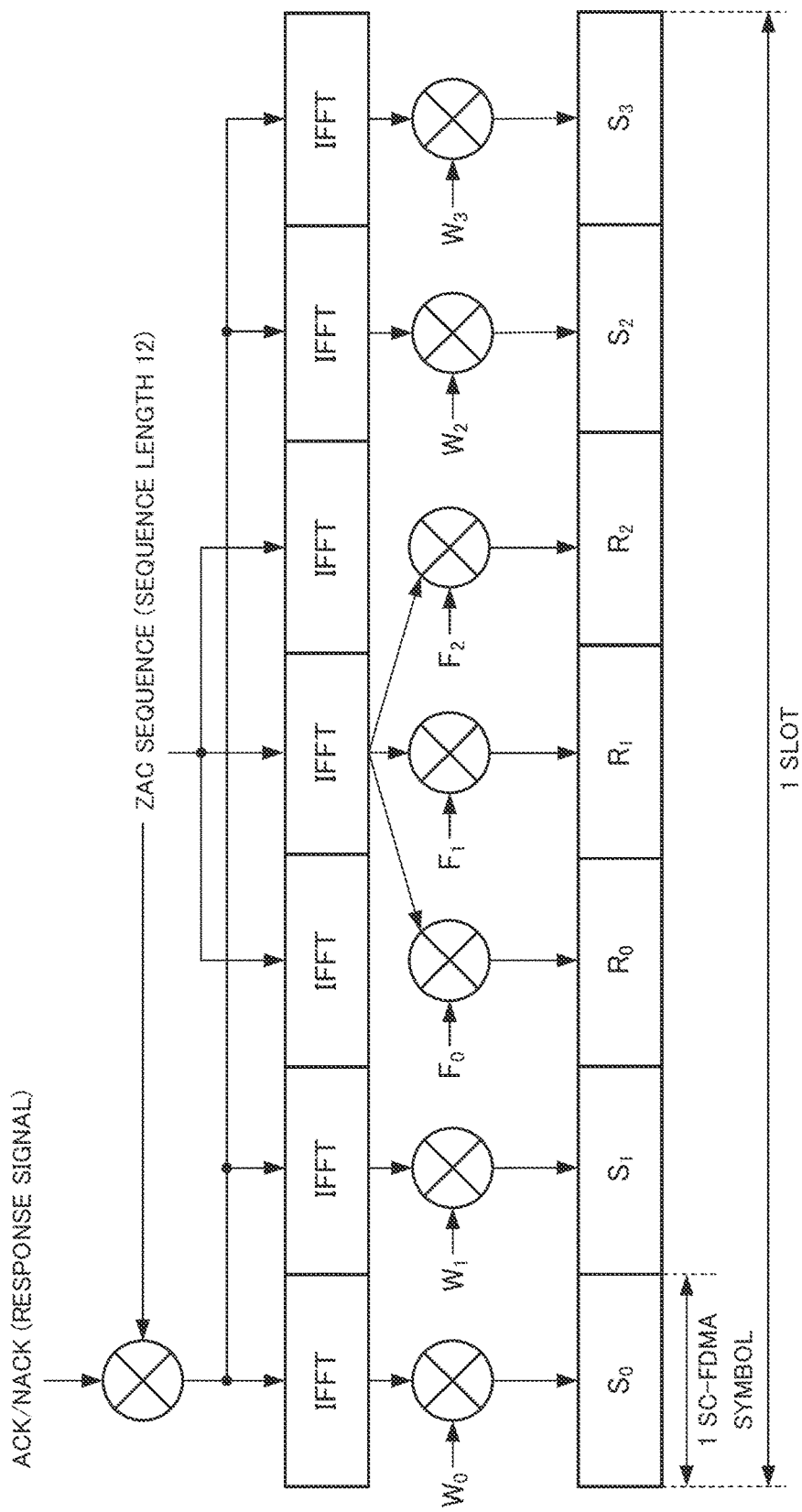
FIG. 1 is a diagram illustrating a method of spreading a response signal and reference signal.
Figure 2B:
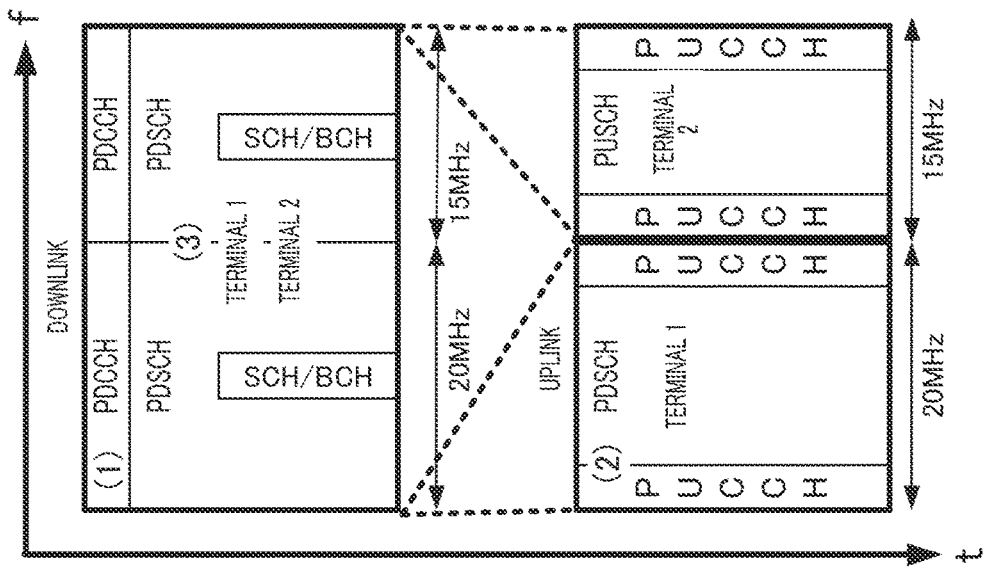
FIG. 2A is a diagram illustrating a control sequence for an asymmetric carrier aggregation as applied to individual terminals in the manner shown in FIG. 2B.
Figure 2A:
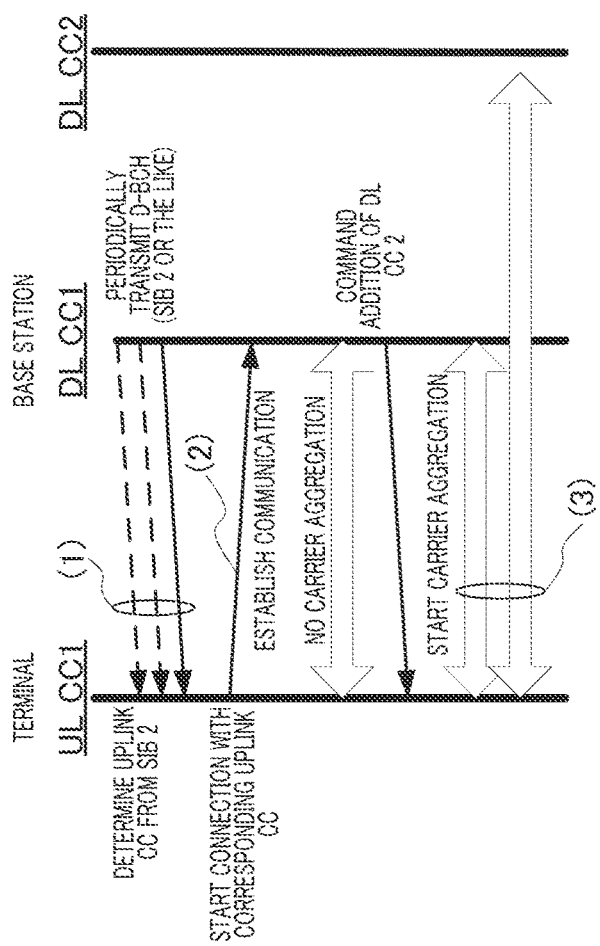
Figure 3:
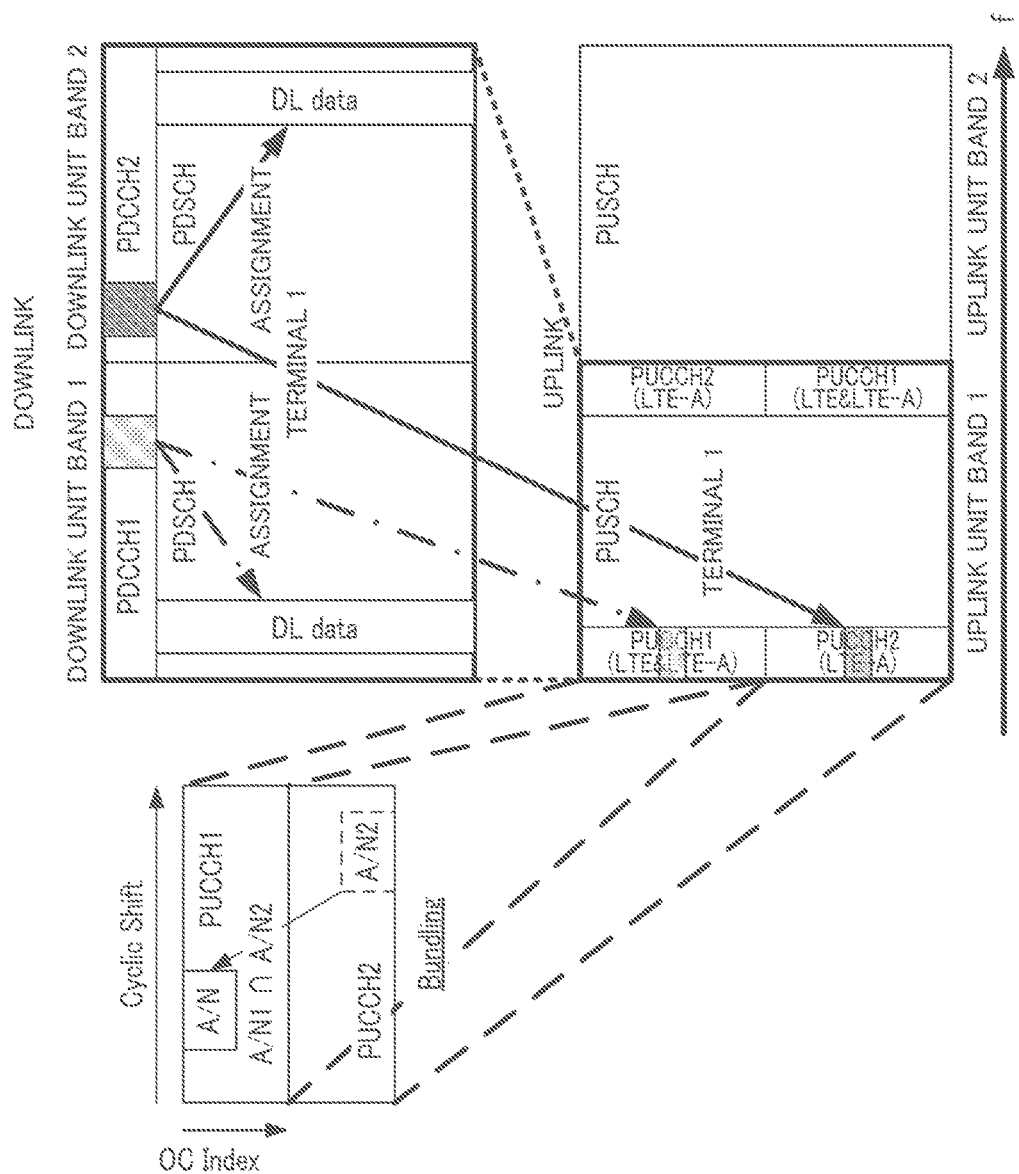
FIG. 3 is a diagram illustrating ARQ control when carrier aggregation is applied to a terminal.

Hereinafter, embodiments of the present invention will be described in detail with reference to the accompanying drawings. The same components among the embodiments will be assigned the same reference numerals and overlapping descriptions thereof will be omitted.

Embodiment 1

[Overview of Communication System]

A communication system including base station 100 and terminal 200, which will be described later, performs communication using an uplink unit band and a plurality of downlink unit bands associated with the uplink unit band, that is, communication through asymmetric carrier aggregation peculiar to terminal 200. Furthermore, this communication system also includes a terminal that has no capability to perform communication through carrier aggregation unlike terminal 200 and performs communication through one downlink unit band and one uplink unit band associated therewith (that is, communication without carrier aggregation).

Therefore, base station 100 is configured to be able to support both communication through asymmetric carrier aggregation and communication without carrier aggregation.

Furthermore, it is also possible to perform communication without carrier aggregation between base station 100 and terminal 200 depending on resource assignment to terminal 200 by base station 100.

Furthermore, this communication system performs ARQ in a conventional way when performing communication without carrier aggregation, but adopts bundling in ARQ when performing communication through carrier aggregation. That is, this communication system is, for example, an LTE-A system and base station 100 is, for example, an LTE-A base station and terminal 200 is, for example, an LTE-A terminal. Furthermore, a terminal having no capability to perform communication through carrier aggregation is, for example, an LTE terminal.

Descriptions will be given below assuming the following matters as premises. That is, asymmetric carrier aggregation peculiar to terminal 200 is constructed beforehand between base station 100 and terminal 200 and information of the downlink unit band and uplink unit band to be used by terminal 200 is shared between base station 100 and terminal 200. Furthermore, the downlink unit band in which a BCH that broadcasts information on the uplink unit band making up a unit band group set (configured) in arbitrary terminal 200 by base station 100 and reported (signaled) to terminal 200 beforehand is transmitted is the "base unit band" for terminal 200. Information on this base unit band is "base unit band information." Therefore, arbitrary terminal 200 can recognize this base unit band information by reading BCH information in each downlink unit band.

[Configuration of Base Station]

Figure 5:
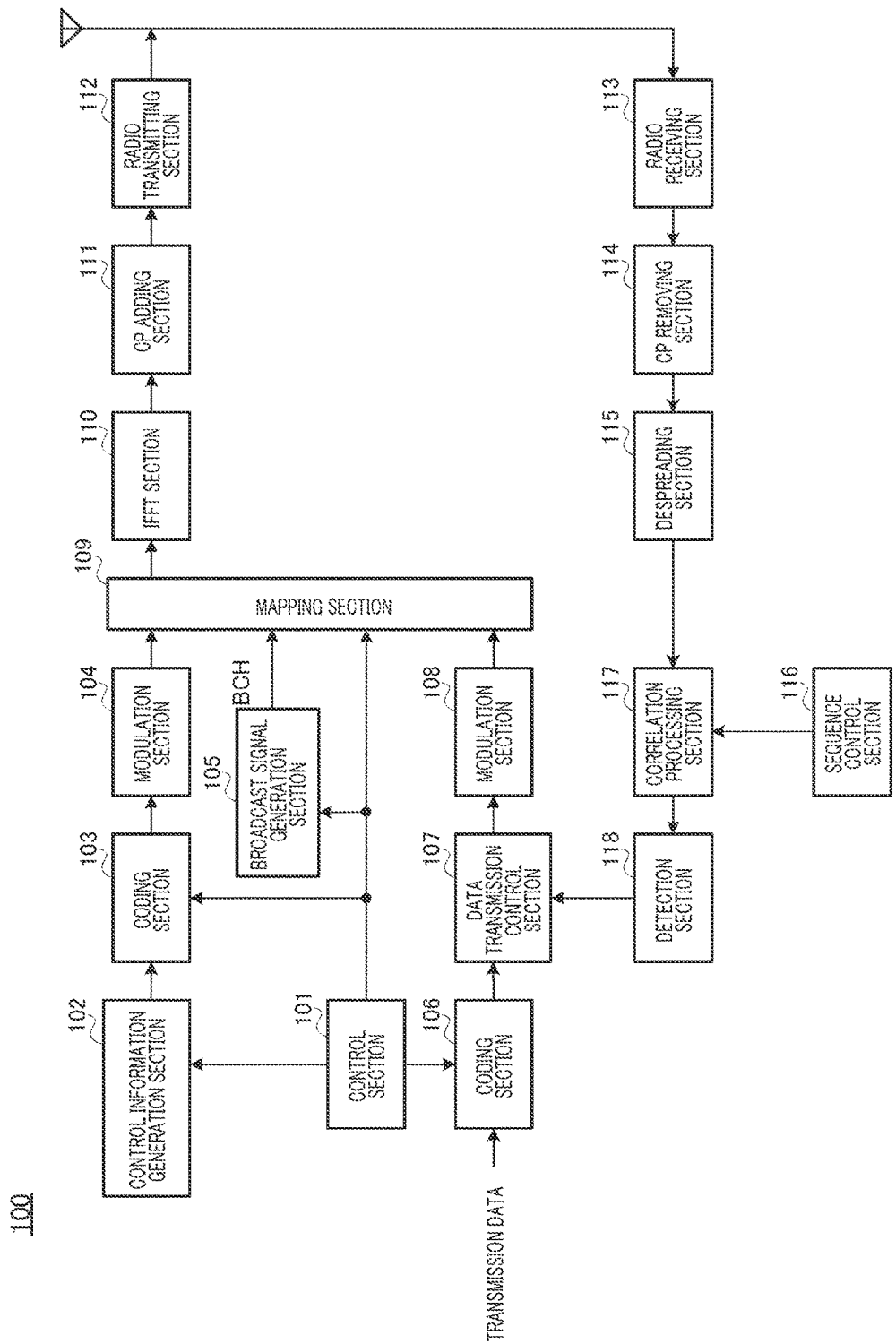
FIG. 5 is a block diagram showing a configuration of a base station according to Embodiment 1 of the present invention.

FIG. 5 is a block diagram showing a configuration of base station 100 according to Embodiment 1 of the present invention. In FIG. 5, base station 100 includes control section 101, control information generation section 102, coding section 103, modulation section 104, broadcast signal generation section 105, coding section 106, data transmission control section 107, modulation section 108, mapping section 109, IFFT section 110, CP adding section 111, radio transmitting section 112, radio receiving section 113, CP removing section 114, despreading section 115, sequence control section 116, correlation processing section 117 and detection section 118.

Control section 101 assigns downlink resources for transmitting control information (that is, downlink control information assignment resources) and downlink resources for transmitting downlink data (that is, downlink data assignment resources) included in the control information to resource assignment target terminal 200. This resource assignment is performed in the downlink unit band included in a unit band group set in resource assignment target terminal 200. Furthermore, downlink control information assignment resources are selected from among resources corresponding to a downlink control channel (PDCCH) in each downlink unit band. Furthermore, downlink data assignment resources are selected from among resources corresponding to a downlink data channel (PDSCH) in each downlink unit band. Furthermore, when there are a plurality of resource assignment target terminals 200, control section 101 assigns different resources to respective resource assignment target terminals 200.

The downlink control information assignment resources is equivalent to the above-described L1/L2 CCH. That is, the downlink control information assignment resource is made up of one or a plurality of CCEs. Furthermore, each CCE is associated with a component resource of an uplink control channel (PUCCH) in a one-to-one correspondence. However, the association between CCEs and PUCCH component resources are performed through the association between a downlink unit band and an uplink unit band broadcast to an LTE system. That is, all component resources of a PUCCH associated with CCEs making up a plurality of downlink control information assignment resources transmitted to terminal 200 are not necessarily included in an uplink unit band set for terminal 200.

Furthermore, control section 101 determines a coding rate used to transmit control information to resource assignment target terminal 200. Since the amount of data of the control information differs according to this coding rate, control section 101 assigns downlink control information assignment resources having a number of CCEs capable of mapping control information of this amount of data.

Furthermore, control section 101 generates a DAI (Downlink Assignment Indicator) which is information indicating the number of downlink unit bands other than the base unit band to which resources are assigned for resource assignment target terminal 200.

Control section 101 outputs information on the downlink data assignment resources as well as the DAI to control information generation section 102. Furthermore, control section 101 outputs information on a coding rate to coding section 103. Furthermore, control section 101 determines a coding rate of transmission data (that is, downlink data) and outputs the coding rate to coding section 106. Furthermore, control section 101 outputs information on downlink data assignment resources and downlink control information assignment resources to mapping section 109. However, control section 101 performs control such that the downlink data and downlink control information corresponding to the downlink data are mapped to the same downlink unit band.

Furthermore, control section 101 outputs a control signal for causing broadcast signal generation section 105 to generate a broadcast channel signal (BCH) transmitted in each downlink unit band to broadcast signal generation section 105.

Control information generation section 102 generates information on the downlink data assignment resources and control information including a DAI and outputs the information to coding section 103. This control information is generated for each downlink unit band. Furthermore, when there are a plurality of resource assignment target terminals 200, the control information includes a terminal ID of the destination terminal to distinguish between resource assignment target terminals 200. For example, a CRC bit masked with a terminal ID of the destination terminal is included in the control information. This control information may be called "downlink assignment control information." However, the DAI is included only in the control information transmitted in a base unit band among downlink unit bands included in the unit band group set in resource assignment target terminal 200.

Coding section 103 encodes the control information according to the coding rate received from control section 101 and outputs the coded control information to modulation section 104.

Modulation section 104 modulates the coded control information and outputs the modulated signal obtained to mapping section 109.

Broadcast signal generation section 105 generates a broadcast signal (BCH) for each downlink unit band according to the control signal received from control section 101 and outputs the broadcast signal to mapping section 109.

Coding section 106 receives transmission data per destination terminal 200 (that is, downlink data) and coding rate information from control section 101 as input and encodes the transmission data and outputs the coded transmission data to data transmission control section 107. However, when a plurality of downlink unit bands are assigned to destination terminal 200, coding section 106 encodes transmission data transmitted in each downlink unit band and outputs the coded transmission data to data transmission control section 107.

At the time of initial transmission, data transmission control section 107 stores the coded transmission data and also outputs the coded transmission data to modulation section 108. The coded transmission data is stored for each destination terminal 200. Furthermore, transmission data for one destination terminal 200 is stored for each downlink unit band transmitted. This enables not only retransmission control over whole data transmitted to destination terminal 200 but also retransmission control per downlink unit band.

Furthermore, upon receiving NACK or DTX from detection section 118, data transmission control section 107 outputs stored data corresponding to terminal 200 that has transmitted this NACK or DTX to modulation section 108. Upon receiving ACK from detection section 118, data transmission control section 107 deletes the stored data corresponding to terminal 200 that has transmitted this ACK.

Modulation section 108 modulates the coded transmission data received from data transmission control section 107 and outputs the modulated signal to mapping section 109.

Mapping section 109 maps the modulated signal of the control information received from modulation section 104 to resources indicated by the downlink control information assignment resources received from control section 101 and outputs the mapping result to IFFT section 110.

Furthermore, mapping section 109 maps the modulated signal of the transmission data received from modulation section 108 to resources indicated by the downlink data assignment resources received from control section 101 and outputs the mapping result to IFFT section 110.

Furthermore, mapping section 109 maps broadcast information to predetermined time/frequency resources and outputs the mapping result to IFFT section 110.

According to the above-described configuration, a broadcast signal is mapped to each downlink unit band. Furthermore, in the case where downlink data is assigned to terminal 200 in a certain subframe, when carrier aggregation is not applied to resource assignment target terminal 200, the control information and transmission data are mapped to the base unit band of resource assignment target terminal 200, and in the case where carrier aggregation is applied to resource assignment target terminal 200, the control information and transmission data are mapped not only to the base unit band but also to downlink unit bands other than the base unit band in the unit band group.

The control information, transmission data, and broadcast signal mapped to a plurality of subcarriers in a plurality of downlink unit bands by mapping section 109 are transformed by IFFT section 110 from a frequency domain signal to a time domain signal, transformed into an OFDM signal with a CP added by CP adding section 111, subjected to transmission processing such as D/A conversion, amplification and up-conversion in radio transmitting section 112 and transmitted to terminal 200 via an antenna.

Radio receiving section 113 receives a response signal or reference signal transmitted from terminal 200 via the antenna, and performs reception processing such as down-conversion, A/D conversion on the response signal or reference signal.

CP removing section 114 removes a CP added to the response signal or reference signal after the reception processing.

Despreading section 115 despreads the response signal with a block-wise spreading code sequence used for secondary-spreading in terminal 200 and outputs the despread response signal to correlation processing section 117. Furthermore, despreading section 115 despreads the reference signal with an orthogonal sequence used for spreading of the reference signal in terminal 200 and outputs the despread reference signal to correlation processing section 117.

Sequence control section 116 generates a ZAC sequence used for spreading of the response signal transmitted from terminal 200. Furthermore, sequence control section 116 identifies a correlation window containing a signal component from terminal 200 based on resources (e.g. amount of cyclic shift) used in terminal 200. Sequence control section 116 outputs information indicating the identified correlation window and the ZAC sequence generated to correlation processing section 117.

Correlation processing section 117 obtains a correlation value between the despread response signal and despread reference signal, and the ZAC sequence used for primary spreading in terminal 200 using the information indicating the correlation window and the ZAC sequence inputted from sequence control section 116 and outputs the correlation value to detection section 118.

Detection section 118 decides whether the response signal transmitted from the terminal indicates ACK or NACK or DTX based on the correlation value inputted from correlation processing section 117. That is, when the magnitude of the correlation value inputted from correlation processing section 117 is a certain threshold or below, detection section 118 decides that terminal 200 transmits neither ACK nor NACK (DTX) using the resources and when the magnitude of the correlation value is the threshold or above, detection section 118 further decides through coherent detection whether the response signal indicates ACK or NACK. Detection section 118 outputs ACK, NACK or DTX information per terminal to data transmission control section 107.

[Configuration of Terminal]

Figure 6:
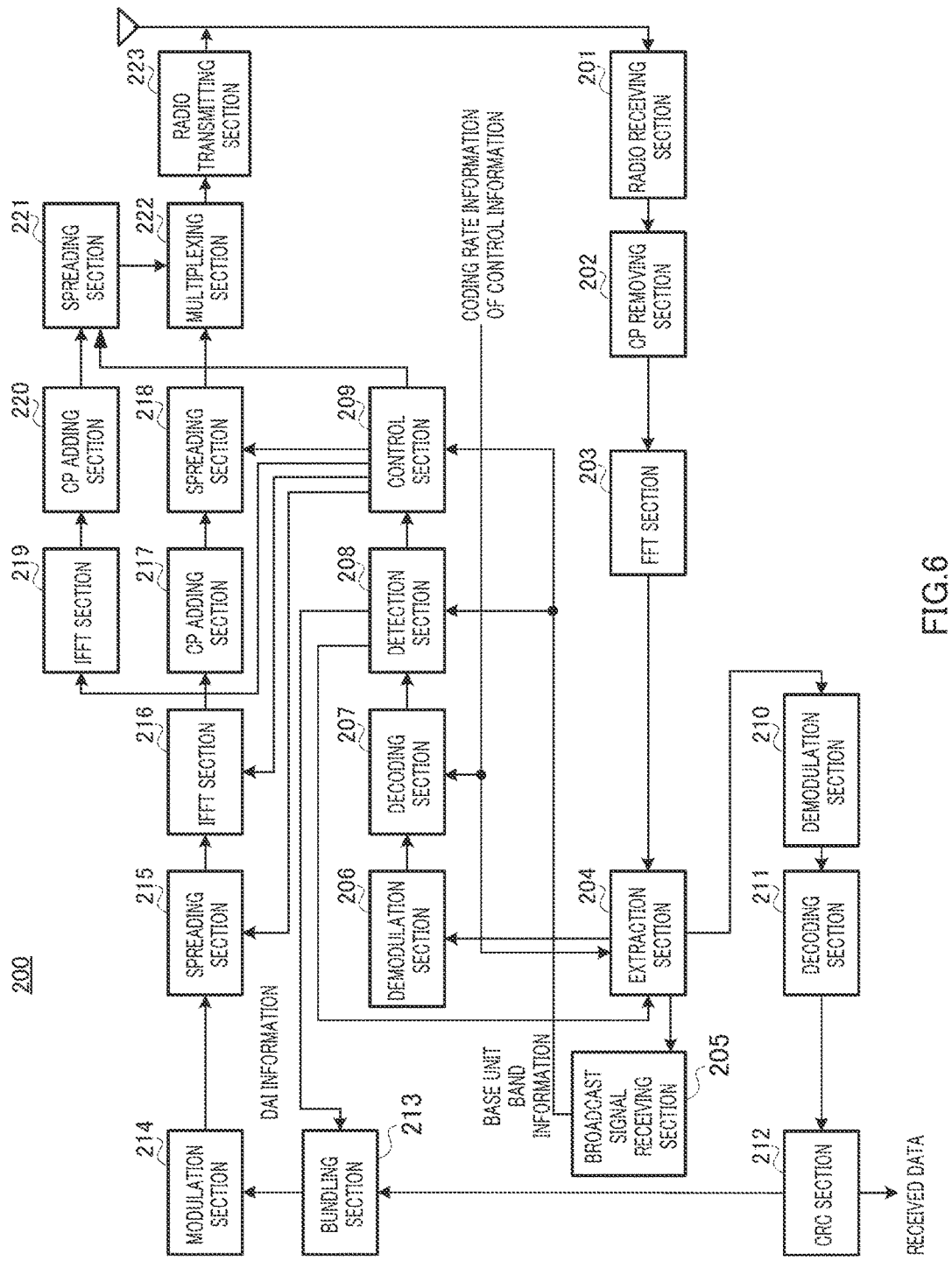
FIG. 6 is a block diagram showing a configuration of a terminal according to Embodiment 1 of the present invention.

FIG. 6 is a block diagram showing a configuration of terminal 200 according to Embodiment 1 of the present invention. In FIG. 6, terminal 200 includes radio receiving section 201, CP removing section 202, FFT section 203, extraction section 204, broadcast signal receiving section 205, demodulation section 206, decoding section 207, detection section 208, control section 209, demodulation section 210, decoding section 211, CRC section 212, bundling section 213, modulation section 214, spreading section 215, IFFT section 216, CP adding section 217, spreading section 218, IFFT section 219, CP adding section 220, spreading section 221, multiplexing section 222 and radio transmitting section 223.

Radio receiving section 201 receives an OFDM signal transmitted from base station 100 via an antenna and performs reception processing such as down-conversion, A/D conversion on the received OFDM signal.

CP removing section 202 removes a CP added to the OFDM signal after the reception processing.

FFT section 203 applies FFT to the received OFDM signal to transform it to a frequency domain signal and outputs the received signal obtained to extraction section 204.

Extraction section 204 extracts a broadcast signal from the received signal received from FFT section 203 and outputs the broadcast signal to broadcast signal receiving section 205. Since a resource to which a broadcast signal is mapped is predetermined, extraction section 204 extracts the information mapped to the resource. Furthermore, the extracted broadcast signal includes information on the association between each downlink unit band and uplink unit band.

Furthermore, extraction section 204 extracts a downlink control channel signal (PDCCH signal) from the received signal received from FFT section 203 according to the inputted coding rate information. That is, since the number of CCEs making up a downlink control information assignment resource changes depending on the coding rate, extraction section 204 extracts the downlink control channel signal using a number of CCEs corresponding to the coding rate as an extraction unit. Furthermore, a downlink control channel signal is extracted for each downlink unit band. The extracted downlink control channel signals are outputted to demodulation section 206.

Furthermore, extraction section 204 extracts downlink data from the received signal based on information on downlink data assignment resources directed to the terminal received from detection section 208 and outputs the downlink data to demodulation section 210.

Broadcast signal receiving section 205 decodes a broadcast signal included for each downlink unit band and extracts information of the uplink unit band that forms a pair with each downlink unit band (that is, information of the uplink unit band reported by SIB 2 mapped to each downlink unit band). Furthermore, broadcast signal receiving section 205 recognizes a downlink unit band that forms a pair with an uplink unit band included in the unit band group corresponding to the terminal as a "base unit band" and outputs the base unit band information to detection section 208 and control section 209.

Demodulation section 206 demodulates the downlink control channel signal received from extraction section 204 and outputs the demodulation result obtained to decoding section 207.

Decoding section 207 decodes the demodulation result received from demodulation section 206 according to coding rate information inputted and outputs the decoding result obtained to detection section 208.

Detection section 208 makes a blind detection as to whether control information included in the decoding result received from decoding section 207 is control information directed to the terminal or not. This detection is made based on the unit of the decoding result corresponding to the above-described extraction unit. For example, detection section 208 demasks a CRC bit with a terminal ID of the terminal and decides control information resulting in CRC=OK (no error) to be control information directed to the terminal. Detection section 208 then outputs information on the downlink data assignment resources for the terminal included in control information directed to the terminal to extraction section 204. Furthermore, detection section 208 outputs a DAI included in the control information directed to the terminal obtained in the base unit band to bundling section 213.

Furthermore, detection section 208 identifies a CCE to which the control information directed to the terminal is mapped in the downlink control channel of the base unit band and outputs the identification information of the identified CCE to control section 209.

Control section 209 identifies a PUCCH resource (frequency/code) corresponding to the CCE indicated by the CCE identification information received from detection section 208. Control section 209 then outputs a ZAC sequence and an amount of cyclic shift corresponding to the identified PUCCH resources to spreading section 215 and outputs the frequency resource information to IFFT section 216. Furthermore, control section 209 outputs the ZAC sequence and frequency resource information to IFFT section 219 as a reference signal, outputs a block-wise spreading code sequence to be used for secondary-spreading of a response signal to spreading section 218 and outputs an orthogonal sequence to be used for secondary-spreading of the reference signal to spreading section 221.

Demodulation section 210 demodulates the downlink data received from extraction section 204 and outputs the demodulated downlink data to decoding section 211.

Decoding section 211 decodes the downlink data received from demodulation section 210 and outputs the decoded downlink data to CRC section 212.

CRC section 212 generates decoded downlink data received from decoding section 211, performs error detection per downlink unit band using a CRC and outputs ACK when CRC=OK (no error) or NACK when CRC=NG (error present) to bundling section 213. Furthermore, when CRC=OK (no error), CRC section 212 outputs the decoded downlink data as received data.

Bundling section 213 generates a response signal to be transmitted from the terminal to base station 100 based on the reception situation of the downlink data transmitted in each downlink unit band included in the unit band group set in the terminal and the DAI received from detection section 208. Transmission control of the response signal will be described in detail later.

Modulation section 214 modulates a response signal inputted from bundling section 213 and outputs the modulated response signal to spreading section 215.

Spreading section 215 primary-spreads the response signal based on the ZAC sequence and the amount of cyclic shift set by control section 209 and outputs the primary-spread response signal to IFFT section 216. That is, spreading section 215 primary-spreads the response signal according to the command from control section 209.

IFFT section 216 arranges the primary-spread response signal on the frequency axis based on the frequency resource information inputted from control section 209 and performs IFFT. IFFT section 216 then outputs the response signal after the IFFT to CP adding section 217.

CP adding section 217 adds the same signal as the end portion of the response signal after the IFFT at the head of the response signal as a CP.

Spreading section 218 secondary-spreads the response signal with the CP added using a block-wise spreading code sequence set by control section 209 and outputs the secondary-spread response signal to multiplexing section 222. That is, spreading section 218 secondary-spreads the primary-spread response signal using the block-wise spreading code sequence corresponding to the resource selected by control section 209.

IFFT section 219 arranges the reference signal on the frequency axis based on the frequency resource information inputted from control section 209 and performs IFFT. IFFT section 219 outputs the reference signal after the IFFT to CP adding section 220.

CP adding section 220 adds the same signal as the end portion of the reference signal after the IFFT at the head of the reference signal as a CP.

Spreading section 221 spreads the reference signal with the CP added in the orthogonal sequence commanded from control section 209 and outputs the spread reference signal to multiplexing section 222.

Multiplexing section 222 time-multiplexes the secondary-spread response signal and the spread reference signal in one slot and outputs the multiplexed signal to radio transmitting section 223.

Radio transmitting section 223 performs transmission processing such as D/A conversion, amplification and up-conversion on the secondary-spread response signal or the spread reference signal. Radio transmitting section 223 then transmits the signal to base station 100 from the antenna.

[Operations of Base Station 100 and Terminal 200]

Figure 7B:
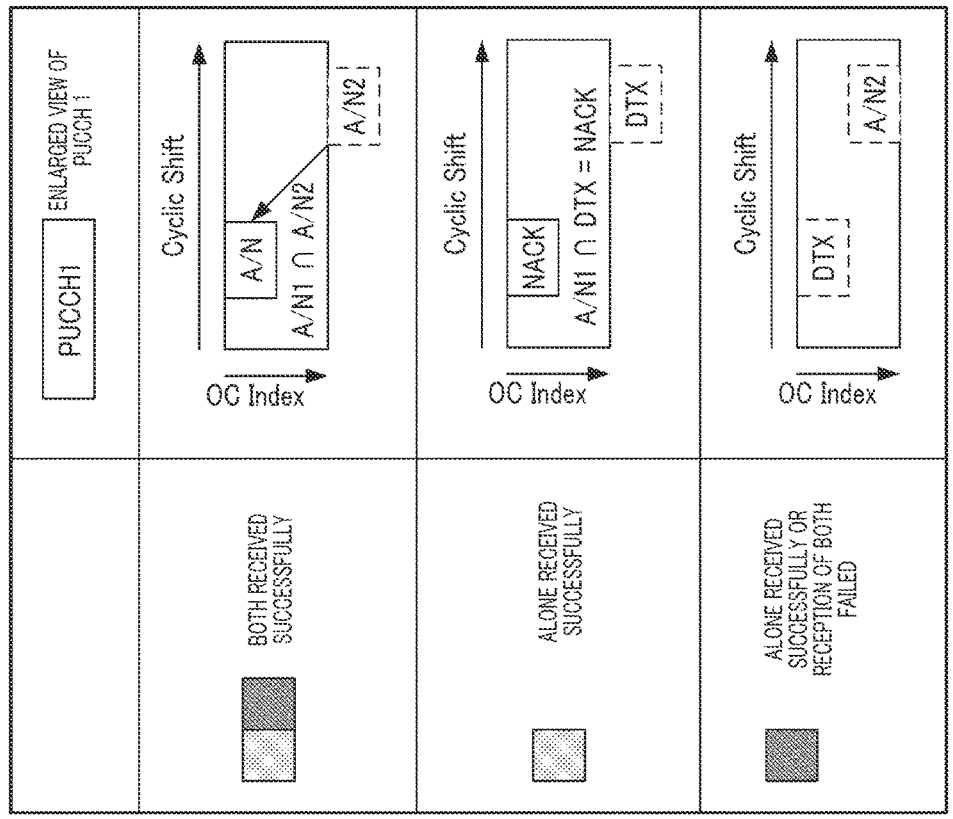
FIG. 7A and FIG. 7B are diagrams illustrating operations of the base station and terminal.
Figure 7A:
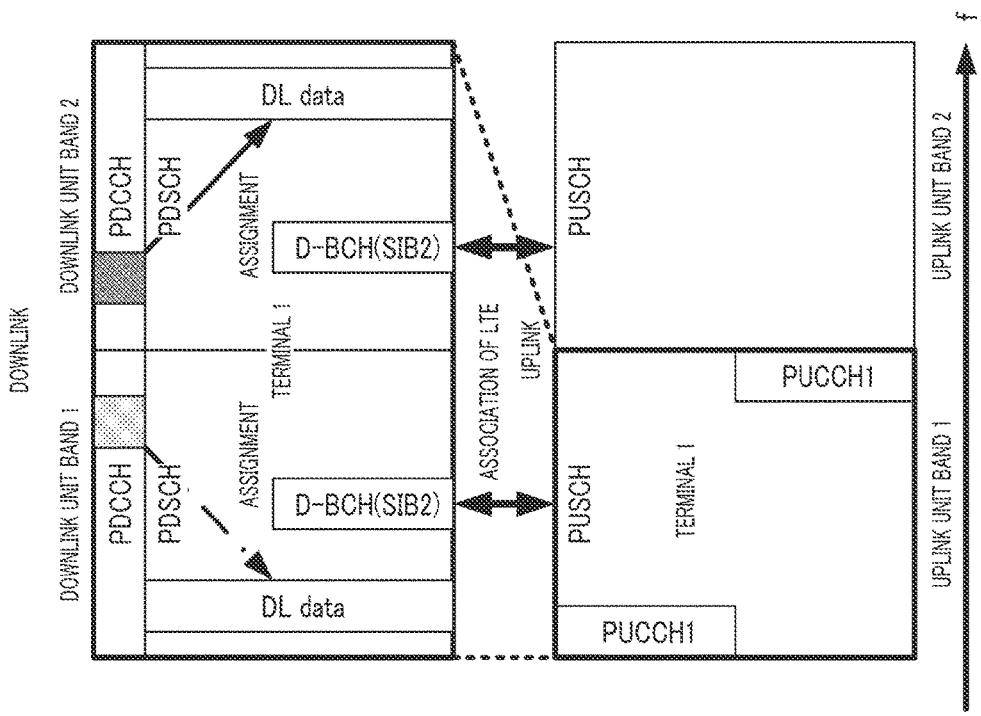

Operations of base station 100 and terminal 200 in the above-described configurations will be described. FIG. 7A and FIG. 7B are diagrams illustrating operations of base station 100 and terminal 200.

<Resource Assignment Control by Base Station 100>

In base station 100, control section 101 stores information on the base unit band in the unit band group set in each terminal 200. When transmitting downlink data to terminal 200, control section 101 uses the base unit band for terminal 200 with high priority. That is, when the base station 100 side transmits one piece of data (also referred to as "transport block: TB") to terminal 200, control section 101 performs control so as to map data to the base unit band for terminal 200 and also generates DAI bit information for reporting that no data is arranged in the downlink unit band other than the base unit band to terminal 200. This DAI bit is outputted from control section 101 to control information generation section 102 together with other control information and transmitted in the same downlink unit band as that of the downlink data. Furthermore, when the base station 100 side simultaneously transmits two or more pieces of data to terminal 200, control section 101 performs control so as to always map one piece of data to the base unit band of terminal 200 and the remaining pieces of data to an arbitrary downlink unit band except the base unit band in the unit band group. Control section 101 generates DAI bit information for reporting the number of unit bands in which data is arranged in a downlink unit band other than the base unit band to terminal 200 and outputs the DAI bit information to control information generation section 102. This DAI bit is included in the downlink assignment control information transmitted in the base unit band and reported to terminal 200.

Base station 100 transmits downlink assignment control information in the downlink unit band used to transmit downlink data in the unit band group set in terminal 200 which is the destination of the downlink data to terminal 200. Furthermore, base station 100 reports the number of downlink unit bands other than the base unit band used to transmit downlink data to destination terminal 200 through the DAI included in the downlink assignment control information transmitted in the base unit band.

Describing more specifically with reference to FIG. 7A, a unit band group made up of downlink unit bands 1 and 2 and uplink unit band 1 is set for destination terminal 200 (terminal 1 in FIG. 7A). Here, when communication using carrier aggregation is applied to destination terminal 200, base station 100 transmits downlink assignment control information to terminal 1 using both downlink unit bands 1 and 2. To transmit this downlink assignment control information, base station 100 assigns subchannels (that is, L1/L2 CCH) included in the downlink control channel (PDCCH) of the downlink unit band to terminal 1 and transmits downlink assignment control information to terminal 1 using the assigned subchannels. Each subchannel is made up of one or a plurality of CCEs.

<Reception of Downlink Data by Terminal 200>

In terminal 200, broadcast signal receiving section 205 identifies the downlink unit band in which a BCH that broadcasts information on the uplink unit band making up the unit band group reported to terminal 200 is transmitted as a base unit band.

Furthermore, detection section 208 decides whether downlink assignment control information directed to terminal 200 is included in the downlink control channel of each downlink unit band or not and outputs downlink assignment control information directed to terminal 200 to extraction section 204.

Extraction section 204 extracts downlink data from the received signal based on the downlink assignment control information received from detection section 208.

Thus, terminal 200 can receive the downlink data transmitted from base station 100.

Describing more specifically with reference to FIG. 7A, since a BCH that broadcasts information on uplink unit band 1 is transmitted in downlink unit band 1, downlink unit band 1 becomes the base unit band of terminal 1.

Furthermore, the downlink assignment control information transmitted in downlink unit band 1 includes information on resources used to transmit downlink data (DL data) transmitted in downlink unit band 1 and the downlink assignment control information transmitted in downlink unit band 2 includes information on resources used to transmit downlink data transmitted in downlink unit band 2.

Therefore, terminal 1 receives the downlink assignment control information transmitted in downlink unit band 1 and the downlink assignment control information transmitted in downlink unit band 2, and can thereby receive downlink data in both downlink unit band 1 and downlink unit band 2. Conversely, if terminal 1 cannot receive the downlink assignment control information, terminal 1 cannot receive the downlink data.

Furthermore, through the DAI transmitted in downlink unit band 1, terminal 200 can recognize that the downlink assignment control information is transmitted not only in downlink unit band 1 which is the base unit band but also in downlink unit band 2.

<Response by Terminal 200>

CRC section 212 performs error detection on the downlink data corresponding to the downlink assignment control information that has been received successfully and outputs the error detection result to bundling section 213.

Bundling section 213 then performs transmission control on a response signal based on the error detection result received from CRC section 212 and the DAI received from control section 209.

That is, when receiving the same number of error detection results as pieces of downlink data calculated from the DAI from CRC section 212 (that is, when the reception of the downlink assignment control information is successful in all downlink unit bands), bundling section 213 transmits a bundled ACK/NACK signal which bundles these error detection results into one signal to base station 100.

Furthermore, bundling section 213 succeeds in receiving the downlink assignment control information in the base unit band and receives the error detection result about the downlink data transmitted in the base unit band from CRC section 212, but when the sum total of the error detection results received from CRC section 212 is smaller than the number of pieces of the downlink data calculated from the DAI, bundling section 213 transmits NACK as the bundled ACK/NACK signal. Here, it is assumed that NACK is transmitted, but it may also be assumed that a response signal itself is not transmitted. This is because even if terminal 200 does not transmit any response signal, base station 100 regards this as DTX and performs retransmission control, and retransmission control is performed which has the same result as that in the case where NACK is transmitted.

Furthermore, bundling section 213 does not transmit any response signal to base station 100 not only when bundling section 213 does not receive the error detection result itself from CRC section 212 (that is, when terminal 200 has not succeeded in receiving any downlink assignment control information) but also when bundling section 213 receives only an error detection result about the downlink data transmitted in a downlink unit band other than the base unit band (that is, when the reception of the downlink assignment control information of the base unit band has not been successful).

Transmission control over a response signal will be described more specifically with reference to FIG. 7B. FIG. 7B presupposes that carrier aggregation is applied to communication between base station 100 and terminal 1.

Upon succeeding in receiving both the downlink assignment control information transmitted in downlink unit band 1 and the downlink assignment control information transmitted in downlink unit band 2, bundling section 213 transmits a response signal (that is, bundled ACK/NACK signal) based on the error detection result of the downlink data received with resources indicated by both pieces of downlink assignment control information using PUCCH 1 conventionally provided as a resource for the uplink control channel corresponding to downlink unit band 1.

Furthermore, upon succeeding in receiving only the downlink assignment control information transmitted in downlink unit band 1, bundling section 213 transmits NACK using PUCCH 1.

Furthermore, bundling section 213 does not transmit any response signal not only when failing to receive both the downlink assignment control information transmitted in downlink unit band 1 and the downlink assignment control information transmitted in downlink unit band 2 but also when succeeding in receiving only the downlink assignment control information transmitted in downlink unit band 2. This eliminates the need to secure new resources for the uplink control channel supporting the correspondence between downlink unit band 2 and uplink unit band 1 in the unit band group. As a result, it is possible to reduce overhead of the uplink control channel.

Bundling section 213 receives only the error detection result about the downlink data transmitted in the base unit band from CRC section 212 and when the DAI indicates that the downlink data is transmitted only in the base unit band, bundling section 213 transmits the error detection result received from CRC section 212 to base station 100. In the first place, this is because carrier aggregation is not applied in this case.

Even when the transmission control over a response signal described above is performed, in an ACK/NACK bundling operation, NACK is transmitted from the terminal in the first place if the reception of even one of the pieces of downlink data arranged in the downlink unit band fails, and it is presupposed that the base station side retransmits all the downlink data accordingly, and therefore the retransmission efficiency in ACK/NACK bundling never deteriorates.

By performing the above-described transmission control over a response signal, it is possible to use resources for the uplink control channel used in a band pair of one downlink unit band and one uplink unit band set in a terminal that has no capability to perform communication using carrier aggregation also for the unit band group including this band pair. This is guaranteed by defining the base unit band as a downlink unit band in which a BCH is arranged that broadcasts information of the uplink unit band out of the unit band group in asymmetric carrier aggregation individually configured by the base station for the terminal. Therefore, although performing asymmetric carrier aggregation produces a new correspondence between the downlink unit band and the uplink unit band, there is no need to secure new resources for the uplink control channel corresponding to this correspondence, and it is thereby possible to reduce overhead of the uplink control channel. Furthermore, since the correspondence between the downlink unit band in the band pair set in a terminal having no capability to perform communication using carrier aggregation and resources for the uplink control channel corresponding thereto is also maintained, it is possible to realize a system in which terminals having a capability to perform communication using carrier aggregation and terminals having no capability to perform communication using carrier aggregation can coexist.

As described above, according to the present embodiment, terminal 200 communicates with base station 100 using a unit band group made up of a plurality of downlink unit bands and an uplink unit band and transmits a response signal based on an error detection result of the downlink data transmitted in the downlink control channel of the downlink unit band through an uplink control channel of the uplink unit band corresponding to the resource used to transmit the downlink assignment control information.

In this terminal 200, extraction section 204, demodulation section 206, decoding section 207 and detection section 208 as the control information receiving section receive the downlink assignment control information transmitted through downlink control channels in a plurality of downlink unit bands included in the above-described unit band group, and extraction section 204, demodulation section 210 and decoding section 211 as the downlink data receiving section receive downlink data transmitted through downlink data channels indicated by the above-described downlink assignment control information and CRC section 212 detects a reception error of the received downlink data. Bundling section 213 controls the transmission of a response signal used for retransmission control over downlink data in base station 100 based on the error detection result obtained in CRC section 212 and success/failure in receiving the above-described downlink assignment control information.

Bundling section 213 assumes as a first condition that in the unit band group, downlink assignment control information is transmitted from the base station in the base unit band which is a downlink unit band in which a broadcast channel signal containing information on the uplink unit band is transmitted and a second downlink unit band other than the base unit band, and transmits, when the first condition is satisfied and the above-described control information receiving section succeeds in receiving all the downlink assignment control information transmitted in the base unit band and second downlink unit band and when the first condition is satisfied and the control information receiving section succeeds in receiving only the downlink assignment control information transmitted in the base unit band, a response signal to base station 100 using uplink control channel resources provided for the band pair of the base unit band and the uplink unit band. Furthermore, bundling section 213 does not transmit a response signal to base station 100 when the first condition is satisfied and the control information receiving section succeeds in receiving only the downlink assignment control information transmitted in the second downlink unit band. In the case where terminal 200 does not succeed in receiving even one piece of downlink assignment control information in a certain subframe, the terminal 200 side cannot actually decide whether base station 100 has transmitted the downlink assignment control information to terminal 200 or terminal 200 has failed to receive the downlink assignment control information in the subframe, but in any case, terminal 200 does not transmit any response signal to base station 100.

This eliminates the need to secure new resources for the uplink control channel supporting the correspondence between the downlink unit band other than the base unit band in the unit band group and the uplink unit band that forms a band pair with the base unit band, and can thereby reduce overhead of the uplink control channel.

A case has been described above where a ZAC sequence is used for primary spreading and a block-wise spreading code sequence is used for secondary spreading. However, sequences separable from each other according to different amounts of cyclic shift other than the ZAC sequence may also be used for primary spreading. For example, GCL (Generalized Chirp like) sequence, CAZAC (Constant Amplitude Zero Auto Correlation) sequence, ZC (Zadoff-Chu) sequence, M sequence, PN sequence such as orthogonal gold code sequence or a sequence having abrupt autocorrelation characteristics on the time axis randomly generated by a computer may also be used for primary spreading. On the other hand, for secondary spreading, any sequences may be used as block-wise spreading code sequences as long as these sequences are orthogonal to each other or sequences that can be regarded to be substantially orthogonal to each other. For example, a Walsh sequence or Fourier sequence or the like may be used as a block-wise spreading code sequence for secondary-spreading. In the above descriptions, resources of a response signal (e.g. PUCCH resources) are defined by the amount of cyclic shift of the ZAC sequence and the sequence number of the block-wise spreading code sequence.

Embodiment 2

While Embodiment 1 assumes that when one piece of downlink data (TB) is transmitted from base station 100 to destination terminal 200, the downlink data is always mapped to the base unit band for destination terminal 200, Embodiment 2 is different from Embodiment 1 in that base station 100 only allows destination terminal 200 to arrange the downlink data in any band other than the base unit band, and that a bit (Anchor Assignment Indicator: AAI) indicating whether downlink data is included also in the base unit band in the downlink assignment control information in the downlink unit band other than the base unit band or not (that is, whether downlink assignment control information for terminal 200 has been transmitted in the base unit band or not). That is, Embodiment 2 allows a mode to be switched between a first mode in which the response signal transmission control method described in Embodiment 1 is used and a second mode in which downlink data corresponding to an arbitrary destination terminal is mapped only to a downlink unit band other than the base unit band. Thus, Embodiment 2 improves the degree of freedom relating to mapping of downlink data in the base station compared to Embodiment 1.

Hereinafter, Embodiment 2 will be described more specifically. Configurations of the base station and terminal according to Embodiment 2 are similar to those of Embodiment 1, and will therefore be described using FIG. 5 and FIG. 6.

<Resource Assignment Control by Base Station 100>

When transmitting downlink data to destination terminal 200, control section 101 of base station 100 according to Embodiment 2 determines whether to use a base unit band or other downlink unit bands for destination terminal 200. That is, control section 101 selects the above-described first mode or second mode.

Furthermore, when downlink data is assigned to a downlink unit band other than the base unit band, control section 101 transmits an AAI bit through a downlink control channel in the downlink unit band whether the first mode or second mode. The AAI bit is outputted from control section 101 to control information generation section 102, included in control information by control information generation section 102 and transmitted via a downlink unit band other than the base unit band. This AAI bit indicates whether downlink data is transmitted in the base unit band or not, that is, whether the base unit band is used or not to transmit the downlink data to destination terminal 200.

That is, when selecting the first mode, control section 101 reports the number of assignment unit bands other than the base unit band using a DAI bit in the base unit band and reports that "there is downlink data assignment in the base unit band" to destination terminal 200 using the AAI bit in the downlink unit band other than the base unit band.

Furthermore, when selecting the second mode, control section 101 reports that there is no downlink data assignment in the base unit band" to terminal 200 using the AAI bit in the downlink unit band other than the base unit band. However, even in this case, terminal 200 transmits a response signal using an uplink control channel of the uplink unit band that forms the above-described band pair with the base unit band. Therefore, when selecting the second mode, base station 100 secures uplink control channel resources associated with CCEs used to transmit downlink assignment control information directed to terminal 200 in the downlink unit band other than the base unit band in order to receive a response signal from terminal 200.

This will be described more specifically with reference to FIG. 8A and FIG. 8B. In FIG. 8A, a unit band group made up of downlink unit bands 1 and 2, and uplink unit band 1 is set for terminal 1. FIG. 8A shows a situation in which downlink assignment control information is not transmitted in downlink unit band 1 which is the base unit band, but downlink assignment control information is transmitted only from downlink unit band 2. That is, the second mode is selected in FIG. 8A. Therefore, control section 101 transmits an AAI indicating that "there is no downlink data assignment in the base unit band" to terminal 1 using downlink unit band 2. Base station 100 then secures resources in the uplink control channel of uplink unit band 1 associated with CCEs used to transmit downlink assignment control information directed to terminal 200 in downlink unit band 2 of the unit band group. That is, base station 100 and terminal 200 share the association between CCEs of the downlink control channel in downlink unit band 2 and resources in the uplink control channel (PUCCH 1) of uplink unit band 1 beforehand (in the example in FIG. 8B, information that CCEs having the same identification number in the downlink control channels of downlink unit bands 1 and 2 are associated with the same resources in PUCCH 1 is shared between base station 100 and terminal 200) and the base station controls CCEs to be used by downlink assignment control information for other terminals 200 so that other terminals 200 that receive downlink assignment control information in downlink unit band 1 do not use the same resources. In other words, this PUCCH 1 is a resource also used by the band pair of downlink unit band 1 and uplink unit band 1.

<Response by Terminal 200>

Bundling section 213 of terminal 200 according to Embodiment 2 acquires a DAI or AAI from detection section 208. Upon receiving downlink assignment control information in the base unit band, bundling section 213 recognizes in how many downlink unit bands downlink data is arranged in the unit band group set in terminal 200 according to the DAI extracted from the control information. On the other hand, when bundling section 213 fails to receive the downlink assignment control information in the base unit band and receives the downlink assignment control information in a downlink unit band other than the base unit band, bundling section 213 recognizes whether the downlink data is arranged in the base unit band or not according to the AAI extracted from the control information. The processing of receiving an AAI is common to the processing of receiving a DAI.

Once acquiring the DAI, bundling section 213 operates in the same way as in Embodiment 1.

Upon failing to acquire the DAI and acquiring only the AAI, bundling section 213 performs the following response signal transmission control. When the AAI indicates that there is assignment in the base unit band, bundling section 213 decides that the reception of the downlink assignment control information in the base unit band has failed and does not transmit any response signal as in the case of Embodiment 1.

Conversely, if the AAI indicates "no assignment in the base unit band," bundling section 213 decides that downlink data is transmitted only through a downlink unit band other than the base unit band and transmits a response signal using resources of the uplink control channel corresponding to the CCEs to which the downlink assignment control information received in the downlink unit band is mapped. However, this response signal is not transmitted through the uplink control channel of the uplink unit band (that is, uplink unit band reported with broadcast information in the downlink unit band other than the base unit band) that forms a band pair with the downlink unit band other than the base unit band used to transmit downlink data but transmitted through the uplink control channel of the uplink unit band that forms a band pair with the base unit band according to the association within the unit band group.

To be more specific, in the situation shown in FIG. 8A and FIG. 8B, since downlink assignment control information is transmitted using only downlink unit band 2 which is not the base unit band, bundling section 213 transmits a response signal using resources of PUCCH 1 corresponding to the CCEs to which the downlink assignment control information received in downlink unit band 2 is mapped. However, as shown in FIG. 8B, it is a matter of course that upon failing to receive the downlink assignment control information transmitted in downlink unit band 2, terminal 200 does not transmit any response signal.

Control section 209 controls the resource through which this response signal is transmitted. To be more specific, when the terminal cannot receive the downlink assignment control information directed to the terminal through the base unit band and the AAI in another downlink unit band indicates "no assignment in the base unit band," control section 209 acquires identification numbers (index) of the CCEs to which the downlink assignment control information in the downlink unit band is mapped. Control Section 209 then identifies resources (frequency resource, code resource) of the uplink control channel corresponding to the identification numbers of the above-described acquired CCEs using the same correspondence as the association between CCEs of the downlink control channel of the base unit band and resources of the uplink control channel of the uplink unit band that forms a band pair with the base unit band. Control section 209 then controls spreading section 215, IFFT section 216, spreading section 218, IFFT section 219 and spreading section 221 according to the identified resources of the uplink control channel.

Since a CCE having the same identification number between the base unit band and a downlink unit band other than the base unit band is associated with a resource of the same uplink control channel, base station 100 needs to control the use of the CCE in the base unit band so that resources of the uplink control channel do not collide with each other. For example, by adopting some contrivance such as assigning a CCE having the same identification number in the base unit band to uplink assignment control information corresponding to another terminal 200, it is possible to easily avoid collision among resources of the uplink control channel.

As described above, by providing a second mode in addition to the first mode, it is possible to improve the degree of freedom in the arrangement of downlink data in the base unit band and other downlink unit bands.

As described above, according to the present embodiment, when transmitting downlink data, base station 100 has the first transmission mode in which downlink assignment control information is mapped to the base unit band with higher priority than downlink unit bands other than the base unit band and the second transmission mode in which downlink assignment control information is mapped to downlink unit bands other than the base unit band.

When bundling section 213 assumes the use of the second transmission mode to be a second condition, if the second condition is satisfied and the above-described control information receiving section succeeds in receiving the downlink assignment control information transmitted in a downlink unit band other than the base unit band, terminal 200 transmits a response signal using resources of an uplink control channel provided for the band pair of a downlink unit band other than the base unit band and the uplink unit band.

By so doing, it is possible to improve the degree of freedom in arrangement of downlink data in the base unit band and other downlink unit bands.

Embodiment 3

A case has been described in Embodiments 1 and 2 where the terminal transmits only a response signal for downlink data to the base station. However, the base station may also command the terminal to transmit uplink data in the same subframe in which the terminal transmits a response signal. Embodiment 3 is different from Embodiments 1 and 2 in that the terminal receives a command from the base station to also transmit uplink data in a subframe in which the terminal should transmit a response signal.

[Configuration of Base Station]

Figure 9:
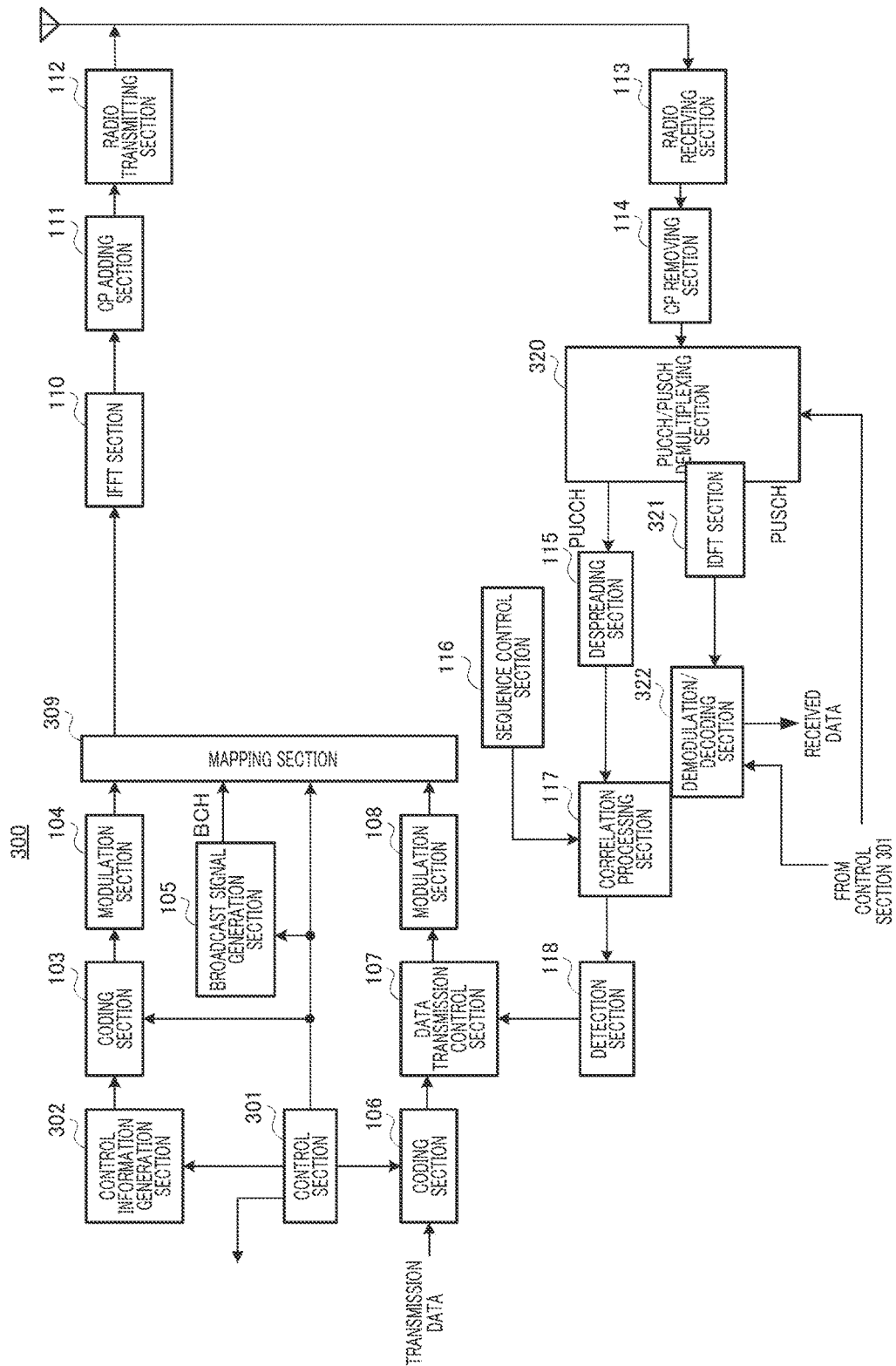
FIG. 9 is a block diagram showing a configuration of a base station according to Embodiment 3 of the present invention.

FIG. 9 is a block diagram showing a configuration of base station 300 according to Embodiment 3 of the present invention. In FIG. 9, base station 300 includes control section 301, control information generation section 302, mapping section 309, PUCCH/PUSCH demultiplexing section 320, IDFT section 321 and demodulation/decoding section 322.

Control section 301 assigns downlink resources to transmit control information (that is, downlink control information assignment resources and uplink control information assignment resources), downlink resources to transmit downlink data included in the control information (that is, downlink data assignment resources) and uplink resources to transmit uplink data (that is, uplink data assignment resources) to resource assignment target terminal 400. This resource assignment is performed in a downlink unit band included in a unit band group set in resource assignment target terminal 400. Furthermore, the downlink control information assignment resources and uplink control information assignment resources are selected from among resources corresponding to a downlink control channel (PDCCH) in each downlink unit band. Furthermore, the downlink data assignment resources are selected from among resources corresponding to a downlink data channel (PDSCH) in each downlink unit band. Furthermore, when there are a plurality of resource assignment target terminals 400, control section 301 assigns different resources to respective resource assignment target terminals 400.

The downlink control information assignment resources and uplink control information assignment resources are equivalent to those of above-described L1/L2 CCH. That is, the downlink control information assignment resources and uplink control information assignment resources are made up of one or a plurality of CCEs. Furthermore, CCEs occupied by the downlink control information assignment resources are associated with component resources of the uplink control channel (PUCCH) in a one-to-one correspondence. However, the association between CCEs and PUCCH component resources is performed as the association between a downlink unit band and an uplink unit band broadcast for an LTE system. That is, the PUCCH component resources associated with CCEs making up a plurality of downlink control information assignment resources transmitted to terminal 400 are not always included in an uplink unit band set for terminal 400.

Furthermore, control section 301 determines a coding rate used to transmit control information to resource assignment target terminal 400. Since the amount of data of control information differs depending on this coding rate, control section 301 assigns downlink control information assignment resources and uplink control information assignment resources having a number of CCEs to which control information of this amount of data can be mapped.

Furthermore, control section 301 generates a DAI (Downlink Assignment Indicator) which is information indicating the number of downlink unit bands other than the base unit band to which resources are assigned for resource assignment target terminal 400.

Control section 301 then outputs information on the downlink data assignment resources and uplink data assignment resources and the DAI to control information generation section 302. Furthermore, control section 301 outputs information on the coding rate to coding section 103. Furthermore, control section 301 determines a coding rate of transmission data (that is, downlink data), outputs the coding rate to coding section 106, determines a coding rate of received data (that is, uplink data) and outputs the coding rate to demodulation/decoding section 322. Furthermore, control section 301 outputs information on the downlink data assignment resources, downlink control information assignment resources and uplink control information assignment resources to mapping section 309. However, as in the case of Embodiment 1, control section 301 performs control so that downlink data and downlink control information corresponding to the downlink data are mapped to the same downlink unit band.

Control information generation section 302 generates downlink assignment control information including information on downlink data assignment resources and the DAI, outputs the downlink assignment control information to coding section 103 and also generates uplink assignment control information including information on uplink data assignment resources and outputs the uplink assignment control information to coding section 103. However, the DAI is included only in the downlink assignment control information transmitted in the base unit band out of the downlink unit band included in a unit band group set in resource assignment target terminal 400.

Mapping section 309 maps a modulated signal of control information received from modulation section 104 to the downlink control information assignment resources received from control section 301 and resources indicated by the uplink control information assignment resources and outputs the mapping result to IFFT section 110.

PUCCH/PUSCH demultiplexing section 320 applies FFT to a received signal and separates resources containing uplink data (that is, PUSCH) from resources (that is, PUCCH) possibly containing a response signal on the frequency axis. PUCCH/PUSCH demultiplexing section 320 then outputs the extracted PUCCH signal (including only a response signal) to despreading section 115 and outputs the frequency component of a PUSCH signal (including only uplink data) to IDFT section 321.

IDFT section 321 applies IDFT processing to the frequency component of the PUSCH signal received from PUCCH/PUSCH demultiplexing section 320 to transform it into a signal on the time axis (time domain signal) and outputs the time domain signal to demodulation/decoding section 322.

Demodulation/decoding section 322 demodulates/decodes the signal component containing uplink data using a coding rate corresponding to the uplink data commanded from control section 301 and outputs the demodulated/decoded signal as received data.

[Configuration of Terminal]

Figure 10:
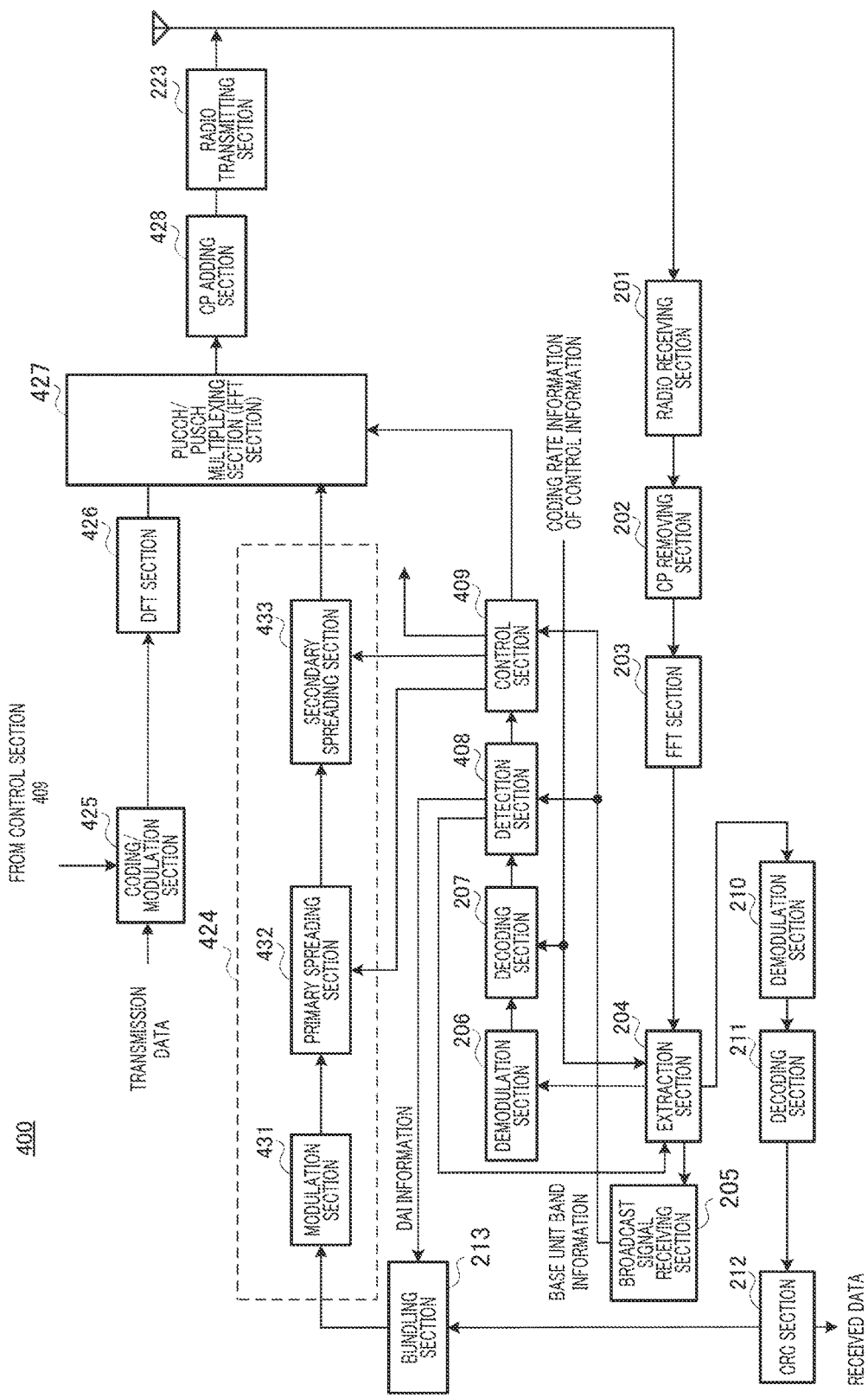
FIG. 10 is a block diagram showing a configuration of a terminal according to Embodiment 3 of the present invention.

FIG. 10 is a block diagram showing a configuration of terminal 400 according to Embodiment 3 of the present invention. In FIG. 10, terminal 400 includes detection section 408, control section 409, uplink control channel generation section 424, coding/modulation section 425, DFT section 426, PUCCH/PUSCH multiplexing section 427 and CP adding section 428.

As in the case of Embodiment 1, detection section 408 makes a blind detection on whether control information included in a decoding result received from decoding section 207 is control information directed to the terminal or not. This detection is made based on the unit of the decoding result corresponding to the above-described extraction unit. For example, detection section 408 demasks a CRC bit with a terminal ID of the terminal and decides that control information which results in CRC=OK (no error) is control information directed to the terminal. Detection section 408 then outputs information on downlink data assignment resources for the terminal included in control information directed to the terminal to extraction section 204 and also outputs information on uplink data assignment resources to control section 409. Furthermore, detection section 408 outputs DAI information included in downlink assignment control information directed to the terminal obtained in the base unit band to bundling section 213.

Furthermore, detection section 408 identifies CCEs to which the above-described downlink assignment control information directed to the terminal is mapped in the downlink control channel of the base unit band and outputs the identification information of the identified CCEs to control section 409.

Control section 409 identifies PUCCH resources (frequency/code) corresponding to the CCEs indicated by the CCE identification information received from detection section 408 within an uplink unit band included in the unit band group. Furthermore, control section 409 identifies PUSCH resources to be used to transmit uplink data (frequency position in the uplink unit band) from the uplink assignment control information received from detection section 408 and outputs the PUSCH resources to PUCCH/PUSCH multiplexing section 427 and also identifies a coding rate and a modulation scheme directed to uplink data from the uplink assignment control information and outputs the coding rate and the modulation scheme to coding/modulation section 425.

Furthermore, upon receiving downlink assignment control information in the base unit band, control section 409 commands PUCCH/PUSCH multiplexing section 427 to multiplex (that is, apply FDM) PUSCH resources and PUCCH resources on the frequency axis. Furthermore, when control section 409 has not received downlink assignment control information in the base unit band, control section 409 commands PUCCH/PUSCH multiplexing section 427 to transmit only uplink data irrespective of the reception situation of downlink assignment control information in other downlink unit bands.

Control section 409 then outputs a ZAC sequence and an amount of cyclic shift corresponding to PUCCH resources to primary spreading section 432 of uplink control channel signal generation section 424 and outputs frequency resource information to PUCCH/PUSCH multiplexing section 427. Furthermore, control section 409 outputs an orthogonal code sequence (that is, Walsh sequence and DFT sequence) to be used for secondary spreading corresponding to PUCCH resources to secondary spreading section 433.

Uplink control channel signal generation section 424 generates an uplink control channel signal (that is, PUCCH signal) transmitted in the uplink unit band based on a response signal received from bundling section 213. To be more specific, uplink control channel signal generation section 424 includes modulation section 431, primary spreading section 432 and secondary spreading section 433.

Modulation section 431 modulates the response signal (that is, bundled ACK/NACK signal) inputted from bundling section 213 and outputs the modulated signal to primary spreading section 432.

Primary spreading section 432 primary-spreads the response signal based on the ZAC sequence and the amount of cyclic shift set by control section 409 and outputs the primary-spread response signal to secondary spreading section 433. That is, primary spreading section 432 primary-spreads the response signal according to a command from control section 409.

Secondary spreading section 433 secondary-spreads the response signal using an orthogonal code sequence set by control section 409 and outputs the secondary-spread response signal to PUCCH/PUSCH multiplexing section 427 as a signal on the frequency axis (frequency domain signal). That is, secondary spreading section 433 secondary-spreads the primary-spread response signal using an orthogonal code sequence corresponding to resources selected by control section 409 and outputs the PUCCH component on the frequency axis to PUCCH/PUSCH multiplexing section 427.

Coding/modulation section 425 performs coding and modulation on transmission data using the coding rate and modulation scheme commanded from control section 409 and outputs the modulated signal to DFT section 426 as a waveform on the time axis.

DFT section 426 transforms the signal on the time axis (time domain signal) inputted from coding/modulation section 425 into a signal on the frequency axis through DFT processing and outputs the signal to PUCCH/PUSCH multiplexing section 427 as a PUSCH signal on the frequency axis.

PUCCH/PUSCH multiplexing section 427 determines whether to multiplex the PUCCH signal and the PUSCH signal on the frequency axis or not according to the command from control section 409. PUCCH/PUSCH multiplexing section 427 performs IFFT processing on the PUCCH signal and PUSCH signal together when multiplexing the signals on the frequency axis, outputs the signal after the processing to CP adding section 428 or performs IFFT processing only on the PUSCH signal when not multiplexing the signals on the frequency axis and outputs the signal after the processing to CP adding section 428.

CP adding section 428 adds the same signal as the end portion of the signal on the time axis after the IFFT at the head of the signal as a CP and outputs the signal with the CP added to radio transmitting section 223.

[Operations of Base Station 300 and Terminal 400]

Figure 11B:
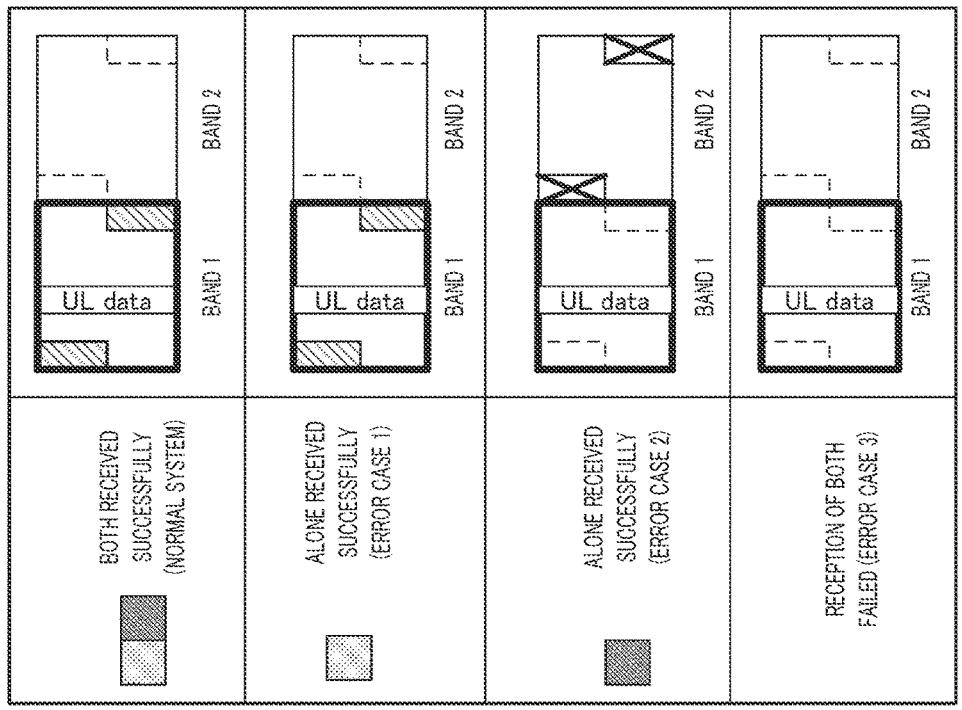
FIG. 11A and FIG. 11B are diagrams illustrating operations of the base station and terminal.
Figure 11A:
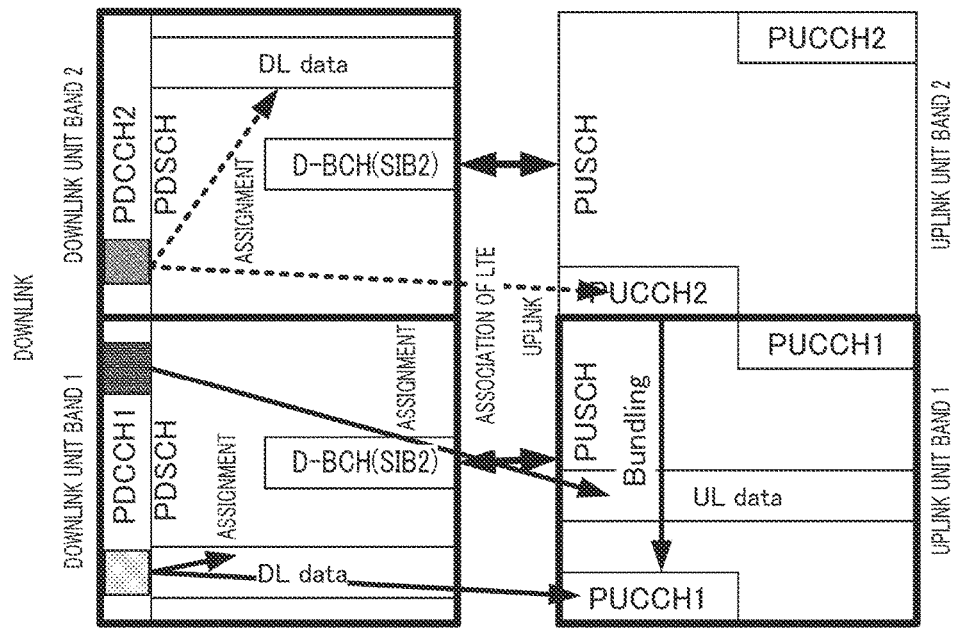

Operations of base station 300 and terminal 400 having the above-described configurations will be described. FIG. 11A and FIG. 11B are diagrams illustrating operations of base station 300 and terminal 400.

<Resource Assignment Control by Base Station 300>

In base station 300, control section 301 stores information on a base unit band in a unit band group set for each terminal 400. When transmitting downlink data to terminal 400, control section 301 uses the base unit band for terminal 400. That is, when the base station 300 side transmits one piece of data (also referred to as "transport block: TB") to terminal 400, control section 301 performs control so as to map data to the base unit band for terminal 400 and generates DAI bit information for reporting that no data is arranged in downlink unit bands other than the base unit band to terminal 400. This DAI bit is outputted to control information generation section 302 from control section 301 together with the other control information and transmitted in the same downlink unit band as that of the downlink data. Furthermore, when the base station 300 side simultaneously transmits two or more pieces of data to terminal 400, control section 301 performs control so as to always map one piece of data to a base unit band of terminal 400 and map the remaining data to an arbitrary downlink unit band except the base unit band in the unit band group. Control section 301 generates DAI bit information for reporting the number of unit bands of downlink unit bands other than the base unit band in which data is arranged to terminal 400 and outputs the DAI bit information to control information generation section 302. This DAI bit is included in the downlink assignment control information transmitted in the base unit band and reported to terminal 400.

Base station 300 transmits to downlink data destination terminal 400 downlink assignment control information in the downlink unit band used to transmit downlink data in the unit band group set in destination terminal 400. Furthermore, base station 300 reports the number of downlink unit bands other than the base unit band used to transmit downlink data to destination terminal 400 using a DAI included in the downlink assignment control information transmitted in the base unit band.

Furthermore, base station 300 assigns uplink resources for uplink data to terminal 400. To be more specific, control section 301 of base station 300 transmits uplink assignment control information indicating uplink resources to terminal 400 using one downlink unit band of the unit band group set for each terminal 400.

Describing more specifically with reference to FIG. 11A and FIG. 11B, a unit band group made up of downlink unit bands 1 and 2 and uplink unit band 1 is set for destination terminal 400 (see FIG. 11A). Here, when communication using carrier aggregation is applied to destination terminal 400, base station 300 transmits downlink assignment control information to terminal 400 using both downlink unit bands 1 and 2. In order to transmit this downlink assignment control information, base station 300 assigns a subchannel (that is, L1/L2 CCH) included in the downlink control channel (PDCCH) of the downlink unit band to terminal 400 and transmits downlink assignment control information to terminal 400 using the assigned subchannel. Each subchannel is made up of one or a plurality of CCEs.

Furthermore, base station 300 transmits uplink assignment control information to report resources for uplink data using one downlink unit band (downlink unit band 1 in FIG. 11A). Like the downlink assignment control information, this uplink assignment control information occupies the subchannel (that is, L1/L2 CCH) included in the downlink control channel (PDCCH) of the downlink unit band.

<Reception of Downlink Data by Terminal 400>

In terminal 400, broadcast signal receiving section 205 identifies, as a base unit band, a downlink unit band in which a BCH is transmitted which broadcasts information on an uplink unit band making up the unit band group reported to terminal 400.

Furthermore, detection section 408 decides whether the downlink control channel of each downlink unit band contains downlink assignment control information directed to the terminal or not and outputs the downlink assignment control information to the terminal to extraction section 204.

Extraction section 204 extracts downlink data from the received signal based on the downlink assignment control information received from detection section 408.

Thus, terminal 400 can receive downlink data transmitted from base station 300.

Describing more specifically with reference to FIG. 11A and FIG. 11B, since a BCH that broadcasts information on uplink unit band 1 is transmitted in downlink unit band 1, downlink unit band 1 becomes the base unit band of terminal 1.

Furthermore, downlink assignment control information transmitted in downlink unit band 1 includes information on resources used to transmit downlink data (DL data) transmitted in downlink unit band 1 and downlink assignment control information transmitted in downlink unit band 2 includes information on resources used to transmit downlink data transmitted in downlink unit band 2.

Therefore, terminal 400 receives the downlink assignment control information transmitted in downlink unit band 1 and the downlink assignment control information transmitted in downlink unit band 2, and can thereby receive downlink data in both downlink unit band 1 and downlink unit band 2. Conversely, when terminal 400 cannot receive the downlink assignment control information, terminal 400 cannot receive the downlink data.

Furthermore, terminal 400 can recognize that downlink assignment control information is transmitted not only in downlink unit band 1 which is the base unit band but also in downlink unit band 2 through a DAI transmitted in downlink unit band 1.

<Transmission of Response Signal and Uplink Data by Terminal 400>

CRC section 212 performs error detection on downlink data corresponding to downlink assignment control information, the reception of which has been successful and outputs the error detection result to bundling section 213.

When control section 409 receives the uplink assignment control information from detection section 408 as input and receives the downlink assignment control information in the base unit band, control section 409 commands PUCCH/PUSCH multiplexing section 427 to frequency-multiplex a PUCCH signal (including a response signal) with a PUSCH signal (including uplink data). However, when control section 409 receives the uplink assignment control information from detection section 408 as input but does not receive the downlink assignment control information in the base unit band, control section 409 commands PUCCH/PUSCH multiplexing section 427 to output only the PUSCH signal.

That is, control section 409 performs control so as not to transmit any response signal to base station 300 not only when terminal 400 has not succeeded in receiving downlink assignment control information but also when terminal 400 has succeeded in receiving downlink assignment control information in only a downlink unit band other than the base unit band (that is, when terminal 400 has not succeeded in receiving downlink assignment control information of the base unit band).

Bundling section 213 then performs the following transmission control on the response signal based on the error detection result received from CRC section 212 and the DAI received from control section 409.

That is, upon receiving as many error detection results as downlink data pieces required by the DAI from CRC section 212 (that is, when the reception of downlink assignment control information has been successful in all downlink unit bands), bundling section 213 bundles these error detection results into one bundled ACK/NACK signal and outputs the bundled ACK/NACK signal to uplink control channel generation section 424.

Furthermore, bundling section 213 succeeds in receiving the downlink assignment control information in the base unit band and receives the error detection results about the downlink data transmitted in the base unit band from CRC section 212, but when the total number of error detection results received from CRC section 212 is smaller than the number of pieces of downlink data required by the DAI, bundling section 213 outputs NACK to uplink control channel generation section 424 as the bundled ACK/NACK signal.

Transmission control over a response signal will be described more specifically with reference to FIG. 11A and FIG. 11B. FIG. 11A and FIG. 11B presuppose that carrier aggregation is applied to communication between base station 300 and terminal 400.

Upon succeeding in receiving both the downlink assignment control information transmitted in downlink unit band 1 and the downlink assignment control information transmitted in downlink unit band 2 and receiving uplink assignment control information (that is, in the case of a normal system in FIG. 11B), control section 409 performs control so as to transmit a response signal (that is, bundled ACK/NACK signal) based on the error detection result of the downlink data received by resources indicated by both pieces of downlink assignment control information through resources in PUCCH 1 conventionally provided as resources for the uplink control channel corresponding to downlink unit band 1 and simultaneously transmit uplink data using uplink resources indicated by the uplink assignment control information. That is, the response signal and uplink data are multiplexed on the frequency axis.

Furthermore, upon succeeding in receiving only the downlink assignment control information transmitted in downlink unit band 1 and receiving the uplink assignment control information (that is, error case 1 in FIG. 11B), control section 409 performs control so as to transmit NACK using resources in PUCCH 1 and simultaneously transmit uplink data using uplink resources indicated by the uplink assignment control information.

Furthermore, when the terminal fails to receive both the downlink assignment control information transmitted in downlink unit band 1 and the downlink assignment control information transmitted in downlink unit band 2 and not only receives the uplink assignment control information (that is, error case 3 in FIG. 11B) but also succeeds in receiving only the downlink assignment control information transmitted in downlink unit band 2 and receives the uplink assignment control information (that is, error case 2 in FIG. 11B), control section 409 does not transmit any response signal but transmits only uplink data. This eliminates the need to secure new resources for the uplink control channel supporting the correspondence between downlink unit band 2 and uplink unit band 1 in the unit band group. As a result, overhead of the uplink control channel can be reduced.

Even when the above-described response signal transmission control is performed, if the reception of even one piece of downlink data arranged in the downlink unit band fails in the ACK/NACK bundling operation in the first place, NACK is transmitted from the terminal and the base station side is presupposed to retransmit all the downlink data accordingly, and therefore the retransmission efficiency in ACK/NACK bundling never deteriorates.

Furthermore, by performing the above-described response signal transmission control, it is possible to use resources for the uplink control channel used in the band pair of one downlink unit band and one uplink unit band set for a terminal having no capability to perform communication through carrier aggregation, also for the unit band group including this band pair. This is guaranteed by defining the base unit band as the downlink unit band in which a BCH is arranged that broadcasts information of the uplink unit band of the unit band group in asymmetric carrier aggregation individually configured by the base station for the terminal. Therefore, although performing asymmetric carrier aggregation produces a new correspondence between the downlink unit band and the uplink unit band, it is not necessary to secure new resources for the uplink control channel supporting this correspondence and it is thereby possible to reduce overhead of the uplink control channel. Furthermore, since the correspondence between the downlink unit band in the band pair set for the terminal having no capability to perform communication through carrier aggregation and resources for the uplink control channel corresponding thereto is also maintained, it is possible to realize a system in which terminals having a capability to perform communication through carrier aggregation and terminals having no capability to perform communication through carrier aggregation can coexist.

As described above, according to the present embodiment, extraction section 204, demodulation section 206, decoding section 207 and detection section 408 as a control information receiving section in terminal 400 receive the downlink assignment control information transmitted through a downlink control channel of one of a plurality of downlink unit bands included in the unit band group. When the control information receiving section (that is, extraction section 204, demodulation section 210, and decoding section 211) succeeds in receiving the downlink assignment control information transmitted in the base unit band and a second downlink unit band other than the base unit band, PUCCH/PUSCH multiplexing section 427 as a transmission signal forming section maps uplink data to resources of the uplink data channel indicated by the uplink assignment control information, thereby frequency-multiplexes the uplink data and the response signal to form a transmission signal and forms, when the control information receiving section succeeds in receiving only the downlink assignment control information transmitted in the second downlink unit band, a transmission signal not including the response signal but including the uplink data.

OTHER EMBODIMENTS (1) A case has been described with the above-described embodiments where only one uplink unit band is included in the unit band group in asymmetric carrier aggregation configured for the terminal. However, the present invention is not limited to this, but a plurality of uplink unit bands may also be included in the unit band group. In this case, the base station commands the terminal on which uplink unit band should be used to transmit the uplink response signal. Even when a plurality of uplink unit bands are included in a unit band group for a certain terminal, if the downlink unit band in which a BCH is transmitted that broadcasts information of the uplink unit band commanded by the base station to be used to transmit an uplink response signal is assumed to be a base unit band for the certain terminal, it is possible to achieve effects similar to those of Embodiments 1 and 2.

(2) Only asymmetric carrier aggregation has been described with the above-described embodiments. However, the present invention is not limited to this, but is also applicable to a case where symmetric carrier aggregation is set with respect to data transmission. In short, the present invention is applicable to cases where the terminal receives downlink data from a plurality of downlink unit bands and transmits an uplink response signal from only one uplink unit band through bundling.

Figure 4:
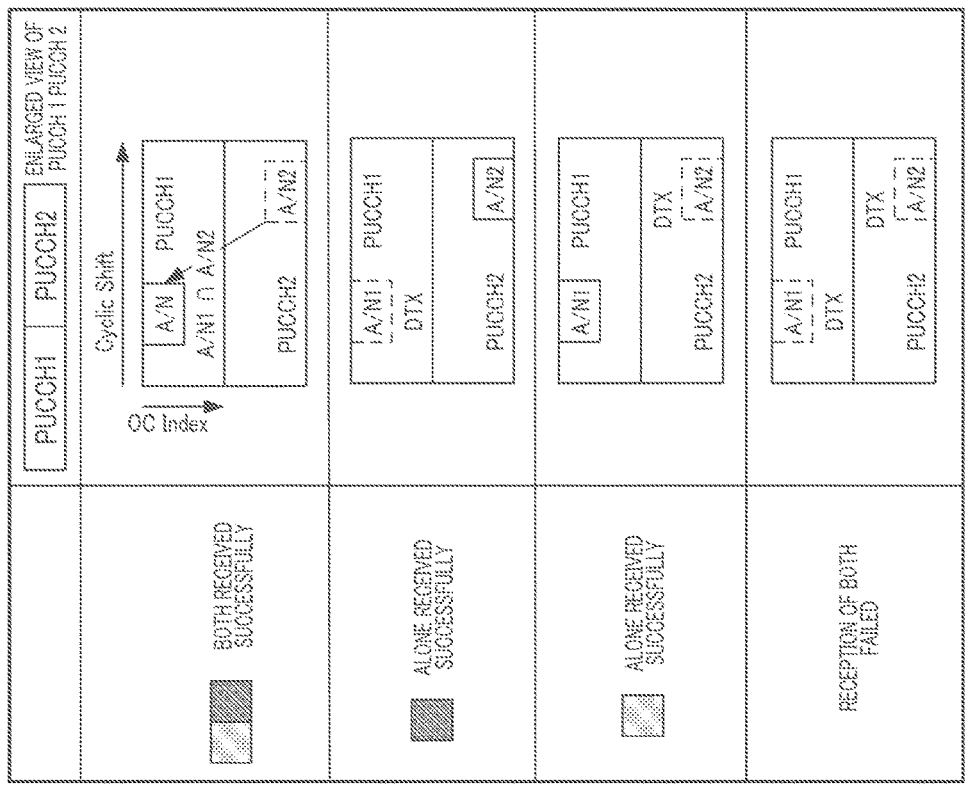
FIG. 4 is a diagram illustrating ARQ control when carrier aggregation is applied to a terminal.
Figure 4:
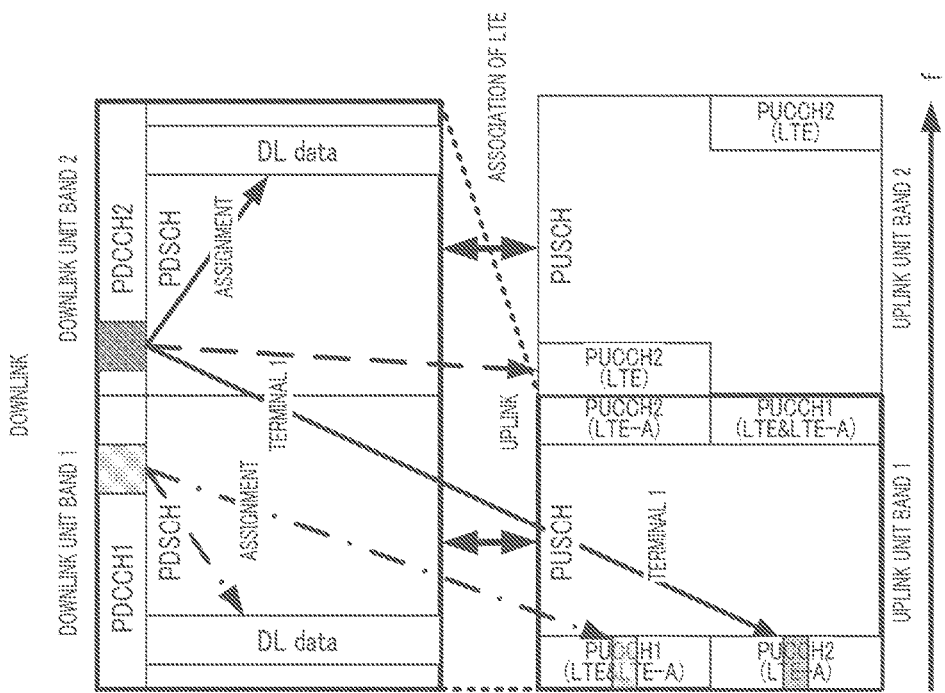

(3) Furthermore, base station 100 may switch between the above-described first mode and a third mode completely free of limitation with respect to assignment of downlink data as shown in FIG. 4 according to availability of uplink resources. In this case, base station 100 reports identification information of the selected mode to terminal 200. When uplink resources are tight, the first mode is advantageous, whereas when downlink resources are tight, the third mode is advantageous.

(4) Furthermore, in the above-described embodiments, to improve retransmission efficiency, a limit may be placed on the ratio of the number of downlink unit bands in UE-specific carrier aggregation to the number of uplink unit bands. For example, the ratio of the number of downlink unit bands/the number of uplink unit bands may be limited to 2 or below. This is because there is a constraint of always using the base unit band in the above-described first mode, and therefore too large a ratio of the number of downlink unit bands/the number of uplink unit bands may cause operational difficulty to increase. However, the ratio of the number of downlink unit bands to the number of uplink unit bands within the system band of the base station need not particularly be limited.

(5) In Embodiment 2, an AAI in the PDCCH of a downlink unit band other than the base unit band is used to report the presence or absence of assignment in the base unit band, but the present invention is not limited to this, and an NDI bit (that is, the bit indicating whether the transmission data is initial data or retransmission data) added to the transmission data may be used as a substitute for the AAI. In this case, when the NDI indicates retransmission, terminal 200 operates assuming as if there were no signal assignment in the base unit band.

(6) Furthermore, the ZAC sequence in the above-described embodiments may be called "base sequence" in the sense of a sequence that serves as a basis for applying cyclic shift processing.

Furthermore, the Walsh sequence may also be called "Walsh code sequence."

(7) Furthermore, a case has been described with the above-described embodiments where secondary spreading is performed after primary spreading and IFFT conversion as the sequence of processing on the terminal side. However, the processing sequence is not limited to this. That is, since both primary spreading and secondary spreading are multiplication processing, equivalent results may be obtained no matter where the secondary spreading processing is located as long as the IFFT processing is located after the primary spreading processing.

(8) Also, although cases have been described with the above embodiment as examples where the present invention is configured by hardware, the present invention can also be realized by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosures of Japanese Patent Application No. 2009-103261, filed on Apr. 21, 2009, and Japanese Patent Application No. 2009-138611, filed on Jun. 9, 2009, including the specifications, drawings and abstracts, are incorporated herein by reference in their entirety.

INDUSTRIAL APPLICABILITY

The terminal apparatus and retransmission control method of the present invention is suitable for use as ones capable of reducing overhead of an uplink control channel when ARQ is applied to communication using an uplink unit band and a plurality of downlink unit bands associated with the uplink unit band.

REFERENCE SIGNS LIST

100, 300 Base station
101, 301 Control section
102, 302 Control information generation section
103, 106 Coding section
104, 108, 214 Modulation section
105 Broadcast signal generation section
107 Data transmission control section
109, 309 Mapping section
110, 216, 219 IFFT section
111, 217, 220, 428 CP adding section
112, 223 Radio transmitting section
113,201 Radio receiving section
114, 202 CP removing section
115 Despreading section
116 Sequence control section
117 Correlation processing section
118 Detection section
200, 400 Terminal
203 FFT section
204 Extraction section
205 Broadcast signal receiving section
206, 210 Demodulation section
207, 211 Decoding section
208, 408 Detection section
209, 409 Control section
212 CRC section 213 Bundling section
215, 218, 221 Spreading section
222 Multiplexing section
320 PUCCH/PUSCH demultiplexing section
321 IDFT section
322 Demodulation/decoding section
424 Uplink control channel generation section
425 Coding/modulation section
426 DFT section
427 PUCCH/PUSCH multiplexing section

The invention claimed is:

1. A terminal that communicates with a base station using a unit band group comprising a plurality of downlink unit bands and uplink unit bands, the plurality of downlink unit bands comprising a downlink base unit band and a downlink non-base unit band, the unit band group comprising control information, the terminal comprising:
  a processor configured:
    to transmit a response signal to the base station using resources of an uplink control channel associated with the downlink base unit band based upon receiving downlink assignment control information transmitted in the downlink unit band and the downlink non-base unit band;
    not to transmit the response signal to the base station when either: (1) not receiving any downlink assignment control information, or (2) receiving an error detection result only about the downlink data information transmitted in a downlink non-base unit band.

2. The terminal of claim 1, wherein the processor is configured to transmit the response signal as a bundled signal.

3. The terminal of claim 1, wherein the processor is further configured to transmit the response signal on an uplink unit band paired with the downlink base unit band.

4. A method in a terminal that communicates with a base station using a unit band group comprising a plurality of downlink unit bands and uplink unit bands, the plurality of downlink unit bands comprising a downlink base unit band a downlink non-base unit band, the unit band group comprising control information, the method comprising:
  transmitting a response signal to the base station using resources of an uplink control channel associated with the downlink base unit band based upon receiving downlink assignment control information transmitted in the downlink unit band and the downlink non-base unit band;
  not to transmit the response signal to the base when either: (1) not receiving any downlink assignment control information, or (2) receiving an error detection result only about the downlink data information transmitted in a downlink non-base unit band.

5. The method of claim 4, further comprising transmitting the response signal as a bundled signal.

6. The method of claim 4, further comprising transmitting the response signal on an uplink unit band paired with the downlink base unit band.

* * * * *